(12) United States Patent
Bruton et al.

(10) Patent No.: US 11,022,533 B2
(45) Date of Patent: Jun. 1, 2021

(54) METHOD OF CONTROLLING PARTICLES SIZE OF FILLERS IN EXTRUDABLE COMPOSITIONS, COMPOSITIONS COMPRISING THE FILLERS AND DEVICES MADE FROM THE COMPOSITIONS

(71) Applicant: The Boeing Company, Chicago, IL (US)

(72) Inventors: Eric Alan Bruton, Lake St. Louis, MO (US); Loyal Bruce Shawgo, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/404,297

(22) Filed: May 6, 2019

(65) Prior Publication Data
US 2020/0355594 A1 Nov. 12, 2020

(51) Int. Cl.
*G01N 15/02* (2006.01)

(52) U.S. Cl.
CPC . *G01N 15/0227* (2013.01); *G01N 2015/0277* (2013.01)

(58) Field of Classification Search
CPC . C08K 3/013; C08K 7/24; C08K 3/26; C08K 2003/267; H01L 23/259; B33B 27/20; C08L 67/04
USPC .......... 356/335–343; 523/213; 524/437, 417, 524/602, 162, 430, 451, 493, 606
See application file for complete search history.

(56) References Cited

U.S. PATENT DOCUMENTS

| | | | |
|---|---|---|---|
| 5,254,177 A * | 10/1993 | Chauvin | C10G 73/40 134/6 |
| 5,904,885 A * | 5/1999 | Arastoopour | B29B 17/0026 264/115 |
| 6,811,867 B1 | 11/2004 | McGurran et al. | |
| 7,888,419 B2 * | 2/2011 | Cooper | C08K 3/34 524/445 |
| 2002/0043654 A1* | 4/2002 | Karttunen | H01B 1/22 252/500 |
| 2006/0191493 A1* | 8/2006 | Holy | D07B 1/142 119/805 |
| 2009/0241983 A1* | 10/2009 | Williams | A61C 15/041 132/321 |

(Continued)

FOREIGN PATENT DOCUMENTS

DE 102015011223 A1 3/2016
EP 3409710 A1 12/2018

OTHER PUBLICATIONS

Extended European Search Report dated Aug. 25, 2020 in corresponding European Application No. 20159276.3 (11 pages).

*Primary Examiner* — Hoa Q Pham
(74) *Attorney, Agent, or Firm* — MH2 Technology Law Group LLP

(57) ABSTRACT

A method of controlling a particle size distribution of a filler in an extrudable composition comprises introducing an extrudable composition comprising a polymer matrix material and a filler into an extruder, the filler having a first average particle size that is larger than a target average particle size. The extrudable composition is extruded one or more times using the extruder to reduce the size of the filler from the first average particle size to a reduced average particle size, the reduced average particle size being within 10% of the target average particle size.

24 Claims, 19 Drawing Sheets

(56) References Cited

U.S. PATENT DOCUMENTS

| | | |
|---|---|---|
| 2010/0162912 A1* | 7/2010 | Kay .......................... C10J 3/00 |
| | | 102/202.14 |
| 2014/0295160 A1 | 10/2014 | Meyer et al. |
| 2015/0073068 A1* | 3/2015 | Komatsu ................. B29C 48/92 |
| | | 523/220 |
| 2016/0137818 A1* | 5/2016 | Kuczynski ............... C08K 9/00 |
| | | 523/218 |
| 2016/0264776 A1* | 9/2016 | Wolfe ...................... C08J 5/046 |
| 2017/0059982 A1 | 3/2017 | Watanabe et al. |
| 2017/0276846 A1 | 9/2017 | Ishido et al. |

\* cited by examiner

FESEM image 1 of OX0.01B45E4 film at magnification of 50,000 times

FESEM image of OX0.01B45E4 at magnification of 50,000 times for image analysis

Example inversion of FESEM image

Particle analysis on FESEM images when lower threshold is set at a particle area of 300 nm² (n=285)

Major and minor axes of an ellipse

METHOD OF CONTROLLING PARTICLES SIZE OF FILLERS IN EXTRUDABLE COMPOSITIONS, COMPOSITIONS COMPRISING THE FILLERS AND DEVICES MADE FROM THE COMPOSITIONS

This Project Agreement Holder (PAH) invention was made with U.S. Government support under Agreement No. W15QKN-14-9-1002 awarded by the U.S. Army Contracting Command New Jersey (ACC-NJ) Contracting Activity to the National Advanced Mobility Consortium. The Government has certain rights in the invention.

DETAILED DESCRIPTION

Field of the Disclosure

The present disclosure is directed to a method of controlling the size of filler particles in an extrudable composition, extrudable compositions comprising the fillers and devices made from the extrudable compositions.

BACKGROUND

Obtaining predetermined particle size distribution for nanosized particles from commercial, off the shelf fillers or additives is often not reliably possible. Sources of fillers, such as, for example, carbon black, generally have a large particle size and/or a wide size distribution. Variability of filler size distributions from sample to sample makes processing difficult. Due to this variability, it is often difficult and expensive to make compositions having specific particle size distributions.

Various techniques are known in the art for making optical materials that employ nano-sized and micron sized particles as fillers. For example, milling carbon to form particles and extruding compositions comprising such carbon particles is a known technique for making glass lenses. Known systems and techniques for forming optical elements having predetermined particles sizes often use a solution-based system. For example, solution-based systems for making optical filters are known. However, solution-based techniques often employ continuous stirring/mixing to maintain the particles suspended in solution, which results in increased cost and process complexity.

Novel techniques for forming materials with desired nano- and micron-sized particle distributions that enable use of off-the-shelf fillers would be a welcome improvement in the art. Additionally, composite materials that include fillers that can handle very high and very low temperature would also be a welcome step forward in the art.

SUMMARY

An implementation of the present disclosure is directed to a method of controlling a particle size distribution of a filler in an extrudable composition. The method comprises introducing an extrudable composition comprising a polymer matrix material and a filler into an extruder, the filler having a first average particle size that is larger than a target average particle size. The extrudable composition is extruded one or more times using the extruder to reduce the size of the filler from the first average particle size to a reduced average particle size, the reduced average particle size being within 10% of the target average particle size.

Another implementation of the present disclosure is directed to a filter. The filter comprises a support substrate. A film is disposed on the support substrate, the film comprising a polymer matrix material and a filler. The filler has a particle size distribution configured to filter a desired range of wavelengths of light, the particle size distribution having been achieved by extrusion.

Still another implementation of the present disclosure is directed to an extrudable composition. The extrudable composition comprises a polymer matrix material and a filler. The filler has an average particle size ranging from about 1 nm to about 700 nm and a concentration ranging from 0.001 weight % to 0.3 weight %, relative to the total weight of the extrudable composition.

Yet another implementation of the present disclosure is directed to a method of controlling a particle size distribution of a filler in an extrudable composition. The method comprises determining a target average particle size for the filler and determining a target concentration of the filler. A first extrudable composition comprising a polymer matrix material and the filler is introduced into an extruder, the filler having a first average particle size that is larger than the target average particle size, the filler being at a concentration ranging from about 0.01 weight % to about 40 weight %, relative to the total weight of the extrudable composition. The first extrudable composition is extruded one or more times to reduce the size of the filler from the first average particle size to a reduced average particle size to thereby form a second extrudable composition. The reduced average particle size is within 10% of the target average particle size. The second extrudable composition is extruded with a diluent polymer to dilute the concentration of the filler to form a third extrudable composition having the target concentration.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

Figure 1:
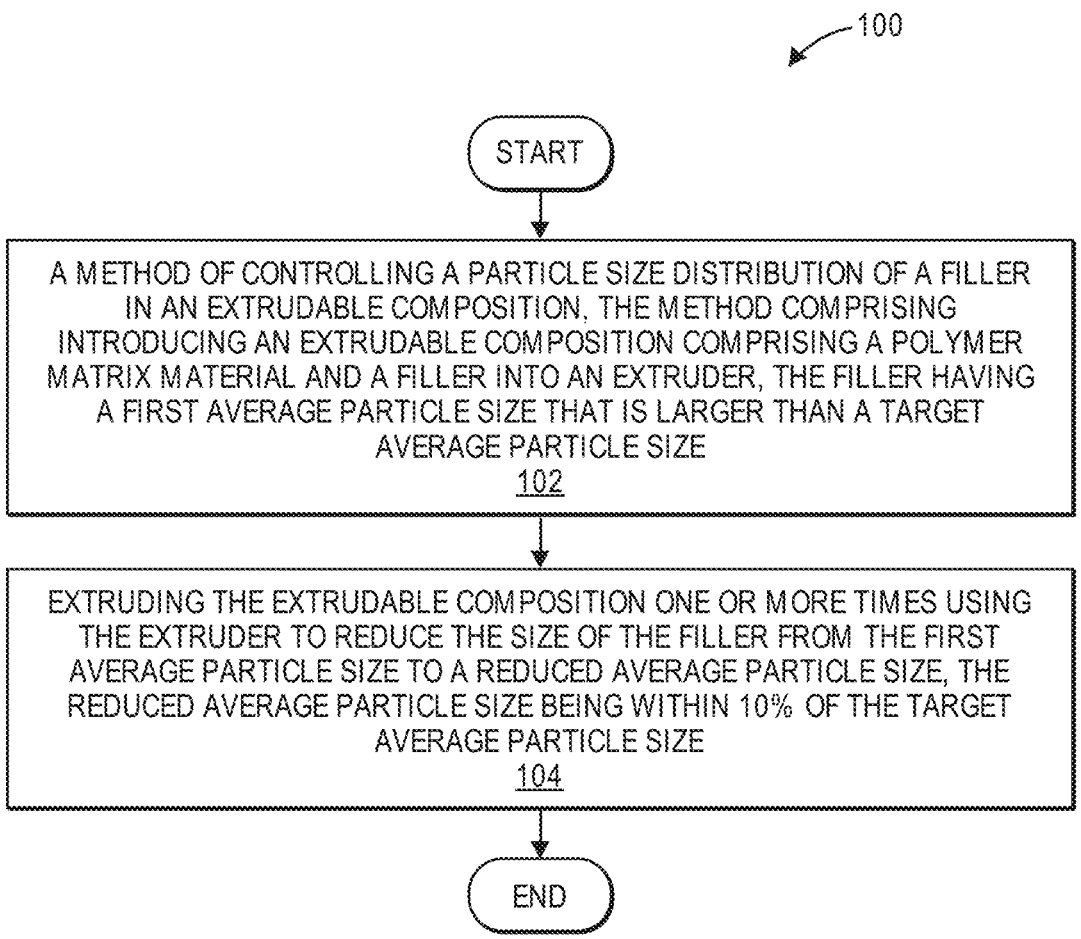
FIG. 1 is a flowchart of a method of controlling a particle size distribution of a filler in an extrudable composition, according to an aspect of the present disclosure.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

It is understood by those skilled in the art that twin screw extruders have small spaces between the twin screws, which can break down very fine particles. While extruders have generally been used to reduce particle size and mix/disperse very fine particles in polymer composites, extruders have not been employed to repeatably and controllably provide targeted particle size distributions for nano-sized and micron-sized particles in extrudable compositions in the past.

The methods of the present disclosure allow for forming materials with desired nano-sized and micron-sized particle size distributions using off-the-shelf fillers that do not have the desired particle size distributions. The methods of the present disclosure provide for uniform mixing of nano-sized and micron-sized particles at low concentrations, such as below 1 wt % particle loading based on the total weight of the composition. The composition materials can, among other things, act as light filters for reducing the intensity of light passing through the filter.

The present disclosure is directed to a method 100 of controlling a particle size distribution of a filler in an extrudable composition, as illustrated in the flowchart of FIG. 1. For purposes of the present disclosure, the particle size is defined as the Feret's diameter, which is determined as described herein below. The phrase "average particle size", as used herein, is defined to be the mean size of the particle distribution based on Feret's diameter, as is also discussed in greater detail below.

As shown at 102 of FIG. 1, the method comprises determining a target average particle size for the filler. The term "determining" as used herein is defined broadly to include arriving at a value for the average particles size by any suitable means, including using mathematical calculations, experimentation, choosing of a desired value from reference materials or receiving or otherwise obtaining a preselected value from a third party. Referring to 104 of FIG. 1, the method further includes introducing an extrudable composition comprising a polymer matrix material and a filler into an extruder. The filler has a first average particle size that is larger than the target average particle size. Whether the first average particle size is larger can be determined by comparing the first average particle size and the target average particle size (both being based on Feret's diameter as discussed herein). The extrudable composition is then extruded one or more times using the extruder to reduce the size of the filler from the first average particle size to a reduced average particle size, the reduced average particle size being within 10% of the target average particle size.

The target average particle size can be any desired size that will provide the desired benefits for which the filler is intended. As an example, the target average particle size can range from about 1 nm to about 700 nm, such as about 10 nm to about 500 nm, or about 50 nm to about 400 nm, or about 100 nm to about 200 nm. Particle sizes within these ranges have certain benefits, depending on the application in which they are employed. For example, particle sizes within the desired target range can provide targeted light filtering of radiation in the visible and/or near infrared ranges of light. The particle size can impact the light scattering depending on operating wavelength(s). Larger particle sizes relative to the wavelength may induce a desired scattering. Smaller particle sizes may be selected to reduce scattering.

If desired, a target concentration of the filler in the final extruded composition can also be determined. Examples of suitable target concentrations include a range of 0.001 weight % to 30 weight %, relative to the total weight of the final extruded composition prior to drying. For certain applications, such as where transparency to visible light and/or light filtering effects are desired, it is desirable to employ very low concentrations of filler as the target for the final extruded composition prior to drying. For example, relatively low target concentrations can range from about 0.001 weight % to about 0.30 weight %, such as from about 0.01 weight % to about 0.15 weight %, relative to the total weight of the final extruded composition prior to drying. Hitting a desired target particle size distribution and/or target particle concentration is difficult for such relatively low concentrations using traditional techniques. The techniques of the present disclosure allow these target particles size distributions and concentrations to be realized.

The filler can be any desired filler to be incorporated into an extrudable matrix material. Examples include fillers chosen from carbon black, carbon nanotubes, graphene, TiO2 and combinations thereof. Commercially available fillers often have an average particle size that is larger than the target average particle size. The initial average particle size for the particles employed in the methods of the present disclosure can be, for example, any commercially available size. Examples of suitable particle sizes included particles ranging from about 20 nm to about 25 millimeters, such as about 800 nm to about 20 millimeters, or about 1 micron to about 20 millimeters. The particles sizes may vary depending on the form of the particles. For instance, for particles in a pelletized form, an initial average particle size may range from about 0.5 millimeters to about 25 millimeters, such as about 1 millimeter to about 20 millimeters. For particles in a powder form, particle sizes can range, for example, from about 20 nm to about 500 microns, such as about 30 nm to about 1200 nm. The ratio of the initial average particle size to the target average particle size can range, for example, from about 1.5 to about 25,000,000.

For certain applications it may be desirable to produce a very uniform particle size distribution using the techniques of the present disclosure. For example, it may be desirable to produce a distribution of particles in which 90% to 100% of the particles are within a given size range, such as any of the target size particle ranges described herein. In another example, it may be desirable to produce a distribution of particles in which 90% to 100% of the particles have a particles size that is within 10% of a given size range, such as within 10% of any of the target size particle ranges described herein. The particle sizes of commercially available fillers may not be sufficiently uniform for such applications.

Employing a relatively high initial concentration of filler during the extrusion process can be a factor in controlling particle size of the filler. This is because increased shear due to grinding of the particles at the higher concentration can be applied to the filler during extrusion at the higher concentrations, allowing filler particle size to be reduced to a greater extent during the extrusion process than if the filler were at lower concentrations. The resulting batches of extruded material with higher concentrations of filler can then be diluted with additional polymer matrix material until the desired lower target concentrations of filler are realized. The additional polymer matrix material can be added, for example, during one or more separate extrusion processes that are employed to intimately mix the polymer matrix material and the filler.

The initial concentration of filler can be any desired concentration, and may vary depending on the application. In one implementation, the initial concentration of filler can be higher than the desired target concentration for the final extruded composition. As an example, the initial filler concentration can range from about 0.01 weight % to about 40 weight %, such as about 1 weight % to about 30 weight %, or about 0.1 weight % to about 20 weight %, or about 0.1 weight % to about 2 weight %, relative to the total weight of the initial extrudable composition.

The extrudable compositions can include any suitable polymer matrix material. Examples of suitable polymer matrix materials comprise at least one polymer chosen from polycarbonates, Polyethylene terephthalate ("PET"), Polyethylene ("PE"), acrylate polymers, vinyl polymers, polyvinylbutyral ("PVB") and a PVB copolymer. The PVB copolymer can comprise polyvinylbutyral units and one or more of polyvinyl alcohol units and polyvinyl acetate units. It is well known that polyvinylbutyral and the disclosed PVB copolymers have a close refractive index with various types of glass and the ability to stick to glass and form a strong bond.

The polymer matrix material can be included in any suitable amount and may vary depending on the application for which the final composition is to be used (e.g., optical filters, other optical elements or still other applications), as well as the number of extrusions to be performed to achieve the desired concentrations and the point in the process at which the extrusion is occurring. For example, in one implementation where multiple extrusion processes are to be performed, the initial concentration of matrix material can be lower than the desired concentration for the final extruded composition. Examples of suitable amounts of polymer matrix material in the initial extrudable material can range from about 60 weight % to about 99.99 weight %, such as about 90 weight % to about 98 weight %, relative to the total weight of the initial extrudable composition. The concentration of polymer matrix material in the final extruded product can be any desired concentration, such as, for example, a concentration ranging from about 90 weight % to about 99.99 weight %, such as about 99 weight % to about 99.99 weight %, relative to the total weight of the final extruded composition.

The initial extrudable composition comprising a polymer matrix material and the filler ingredients are introduced into an extruder, either prior to or subsequent to mixing the ingredients. The extruder can be any suitable type of extruder than can provide the desired shear force to reduce the size of the filler particles, such as a twin screw extruder or a quad screw extruder.

The extrudable composition is then extruded to reduce the size of the filler from the first average particle size to a reduced average particle size, thereby forming a second extrudable composition. The reduced average particle size is within 10% of the target average particle size, as determined by SEM or other suitable microscopy technique. As an example, the first extrudable composition is extruded one or more times, such as 1 to 5 times, or 2 to 4 times, to reduce the size of the filler to achieve a size that is sufficiently close to the chosen target average particle size. After each extrusion the composition can optionally be formed into extrudable pellets. For example, the extruded composition can initially be in the form of long strands that are cut into pellets and dried to form a bulk extrudable material that is then employed as a starting material in subsequent extrusions.

The second extrudable composition can optionally be extruded with a diluent polymer one or more times, such as 1 to 5 times, or 2 to 4 times, to dilute the concentration of the filler and optionally reduce the particle size of the filler further to thereby form a third extrudable composition having the desired target filler concentration. For example, the above described second extrudable composition having the reduced filler average particle size can be added to a second extruder, which can be either the same extruder used to reduce the particle size or a different extruder. Additional polymer matrix material is also added to the second extruder, where the additional polymer can be the same or different than the PVB or PVB copolymers described above. The combined second extrudable composition having the reduced filler average particle size and the additional polymer are then extruded together to thereby dilute the concentration of filler and form the third extrudable composition. This extrusion process and the addition of polymer to the extrudable composition can be repeated any desired number of times until the desired target filler concentration is reached. Thus, repeating the extrusion process in this manner can provide the ability to achieve relatively low target concentrations of filler that is uniformly mixed in the composite compositions.

The extrusion processes for reducing the particle size and dilution of the particle filler concentration can be carried out in any desired order. For example, one or more extrusion processes can be carried out to reduce the particle size, followed by an extrusion process for dilution, followed by a further extrusion process to reduce the particle size. As another example, a first extrusion process can be carried out to reduce the particle size and form a first batch of extrudable material, followed by a second extrusion process that dilutes the first batch by adding additional polymer matrix material and simultaneously reducing the particle size. If desired, the first batch can be formed into pellets, as described herein, which are then employed with the additional polymer matrix material as a starting material for the second extrusion process.

Whether or not the size of the filler is reduced during extrusion and, if reduced, the resulting size of the particles after each extrusion, will depend on a number of factors. These factors include, for example, the type of filler, the type of polymer matrix material, initial concentration of the filler in the extrudable material, the screw setup/screw design in the extruder and other extruder conditions, such as the temperature of extrusion zones and the type of die employed. Given the understanding provided by the present disclosure, including the above factors, one of ordinary skill in the art would be able to modify the processes of the present disclosure in order to controllably and repeatedly obtain the desired particle size distribution of the filler in the extrudable material.

Figure 2:
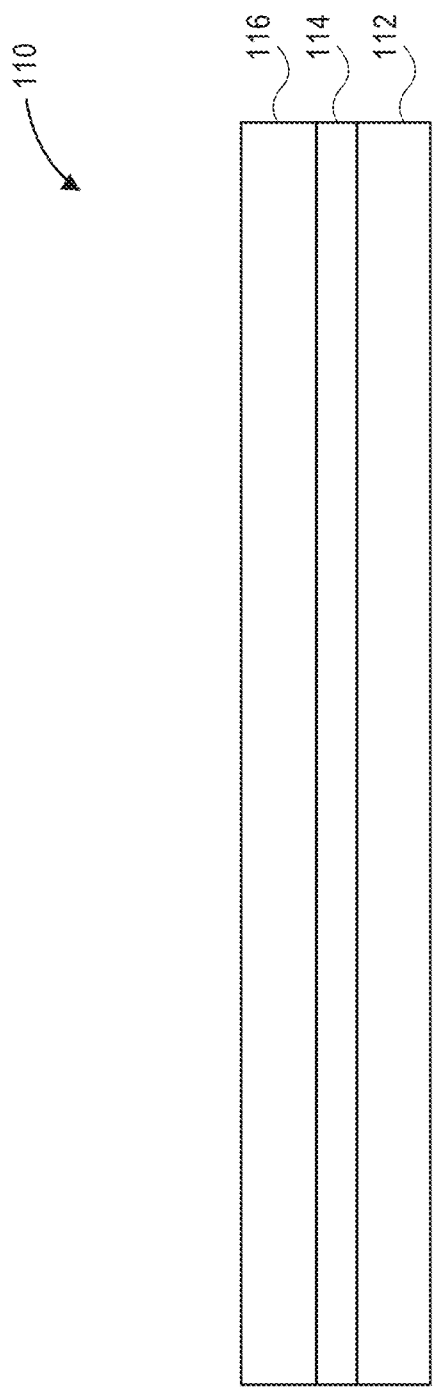
FIG. 2 illustrates a schematic cross-sectional view of a filter, according to an aspect of the present disclosure.

The present disclosure is also directed to a filter for filtering light. An example of a filter 110 is illustrated in FIG. 2. Filter 110 comprises a support substrate 112. A film 114 is disposed on the support substrate 112. Filter 110 optionally includes a second substrate 116, the film 114 being disposed between the support substrate 112 and the second substrate 116.

The filter can have linear or non-linear optical properties. Linear optical properties are constant with the incident light intensity. A linear filter transmits a fixed percentage of the incident light independent of the incident light intensity. For non-linear optical properties, the transmitted light varies with the intensity of incident light. As an example, in a non-linear filter, such as filter 110, under relatively high incident light intensity, the particles of film 114 absorb energy and can change form by dissociating or cause heating of the surrounding polymer matrix material, which in turn causes a refractive index change and subsequent scattering and blocking of light. This can be a passive process that, as an example, only occurs under relatively high incident power.

Film 114 can be any of the extrudable compositions of the present disclosure comprising a polymer matrix material and filler. The polymer matrix material can be any of the polymers described herein. The filler can be any of the fillers described herein and has a particle size distribution configured to filter a desired range of wavelengths of light, including any of the particle sizes and/or particle distributions described herein for the extrudable compositions. The range of wavelengths of light are selected from wavelengths in the visible spectrum, the near infrared spectrum, and both visible and near infrared spectra. As an example, the filtered range of wavelengths of light include wavelengths across the entire visible and near infrared ("NIR") spectrum, where the filter is configured to uniformly reduce the intensity of light across the entire visible spectrum and the NIR spectrum. The amount of light reduction depends on the concentration of filler and the thickness of film 114. As an example, the reduction in light intensity can range from 5% to 80%, or from 20% to 50%, or about 30%, compared to the intensity of visible light incident on the filter. In an example, the filler employed in the film 114 has a reduced average particle size that is within 10% of any of the target average particle sizes, as described herein, and has a concentration ranging from 0.001 weight % to 30 weight %, such as about 0.001 weight % to 0.30 weight %, or about 0.01 weight % to 0.15 weight %, relative to the total weight of the extrudable composition.

The film 114 can have any suitable thickness. For example, thicknesses can range from 1 nanometer to 1 centimeter, such as 1 micron to 1 millimeter. The chosen thickness of the film can provide for a desired level of transparency and/or light filtering. The film thickness can be uniform over the entire film. In another example, the thickness and/or filler concentration of the film 114 can be varied across the length and/or width of the film in order to vary the amount of light intensity reduction across the film. In this manner, a filter having a light intensity reduction gradient can be formed. Such gradients can be used in certain optical applications, including corrective lenses, sunglasses and so forth.

One or both of the support substrate 112 and the second substrate 116 are transparent to visible light. Any suitable materials transparent to visible light can be employed. As an example, one or both of the support substrate and the second substrate comprise at least one material chosen from glass and polycarbonate.

In one example implementation, the refractive index of the support substrate and the optional second substrate are matched to be similar to the refractive index of the film 114. As an example, the support substrate 112 has a first refractive index, the film 114 has a second refractive index and the second substrate 116 has a third refractive index. Mismatch of the refractive index causes a reflection at the interface (bondline) between the film and the substrate. An exact index match between the film and the substrate will have no reflection. In an example, the refractive index of one or both of the support substrate and optional second substrate match the film refractive index sufficiently to avoid or reduce a reflection at the film/substrate interfaces. For example, a ratio of the first refractive index to the second refractive index ranges from 0.9 to 1.1. A ratio of the third refractive index to the second refractive index ranges from 0.9 to 1.1.

The support substrate 112 and second substrate 116 can have any suitable thicknesses that will provide the desired mechanical support and transparency. For example, thickness of substrates 112 and 116 can each range from about 0.1 millimeter to about 50 millimeters, such as about 0.5 millimeter to about 20 millimeters. The substrates 112, 116 can be planar, as shown in FIG. 2, or can have any other desired shape, such as curved, circular or spherical.

Film 114 can be deposited on support substrate 112 in any suitable manner. Examples of suitable techniques include lamination and solution deposition methods. Lamination techniques, for example, can include applying heat and or pressure to the substrate/film/substrate stack. Examples of suitable lamination and other deposition techniques are well known in the art.

The present disclosure is also directed an extrudable composition. The composition comprises a polymer matrix material and a filler incorporated into the polymer matrix material. The filler has a reduced average particle size that is within 10% of any of the target average particle sizes, as described herein, and has a concentration ranging from 0.001 weight % to 30 weight %, such as about 0.001 weight % to 0.30 weight %, or about 0.01 weight % to 0.15 weight %, relative to the total weight of the extrudable composition. The composition can be extruded into long strands that are cut into pellets and dried to form a bulk extrudable material.

EXAMPLES

The extruder used in the examples below employed a 3 mm die, although any other die size could be used. For example, final products could be made using a die that produces a sheet of appropriate thickness to laminate between glass windows.

Materials used in the examples below include one or more of the following:

Kuraray Mowital Polyvinyl Butryal (PVB) B45H and B60H: Polyvinyl Butyral that includes plasticizers.

Akzo Nobel Ketjenblack EC-600 JD carbon black: This carbon black is electrically conductive, highly branched, has a high surface area of 1250 $m^2$/g, and a density of 1.8 g/$cm^3$. This carbon black is in the form of pellets that are 100 μm to 2 mm in size that upon mixing into a polymer easily separate into primary aggregates 30 to 100 nm long.

Cabot Vulcan XC72 carbon black: (pelletized/beaded version that is less fluffy that the XC72R version) This carbon black is electrically conductive, has a surface area of 254 $m^2$/g, a primary particle size of 30 nm, and density of 1.8 g/$cm^3$. This carbon black is in the form of beads (~1 mm) that upon mixing into a polymer easily separate into primary aggregates 36 nm to 1122 nm long.

On the day of extrusion, the powder Kuraray Mowital Polyvinyl Butryal (PVB) B45H and B60H resin bags were opened and used immediately to prevent uptake of moisture. The carbon blacks were used as received.

Figure 3:
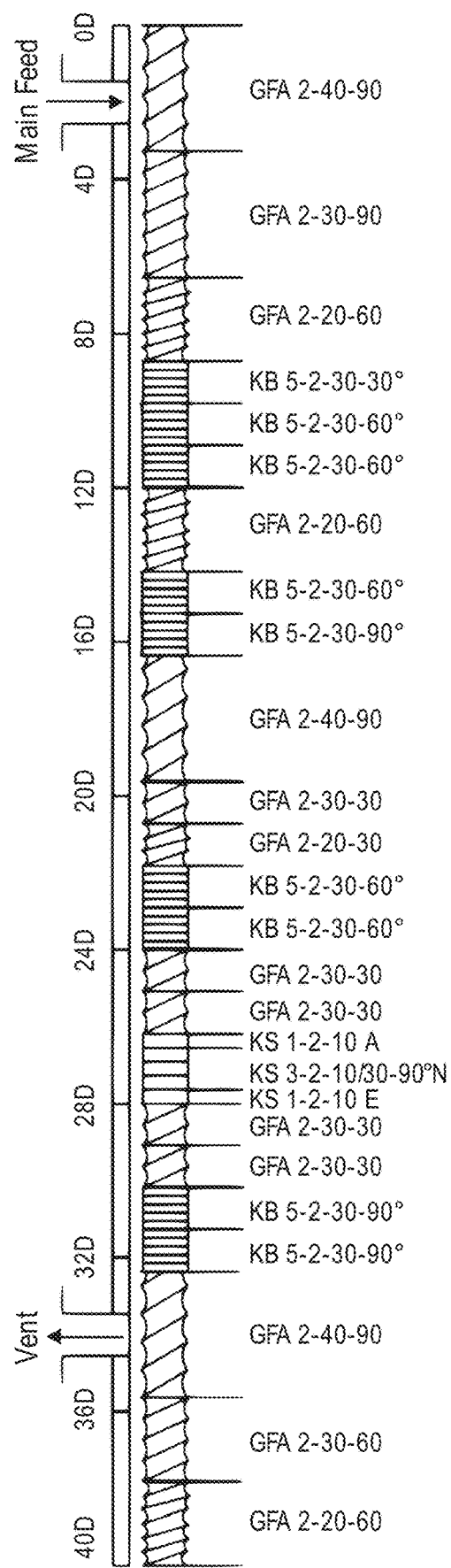
FIG. 3 shows an example extruder screw design, according to an aspect of the present disclosure.
Figure 4A:
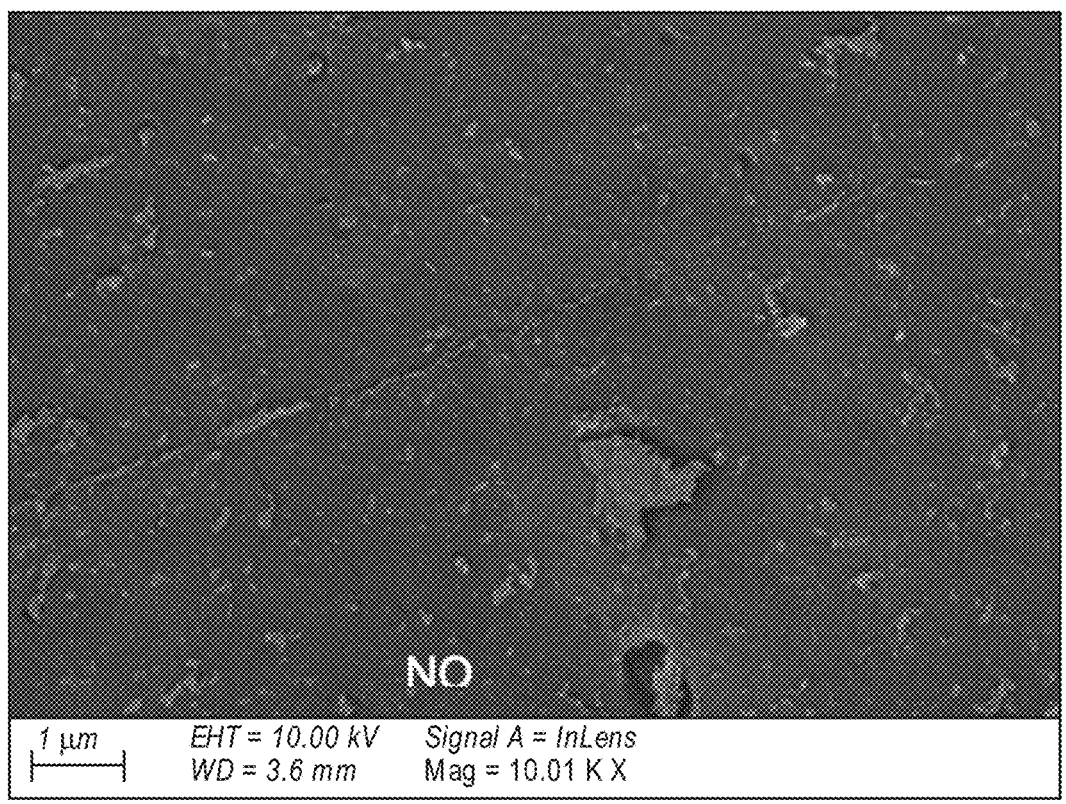
FIGS. 4A, 4B, 4C and 4D show FIB-SEM analysis of carbon black filled PVB pellets having 1 wt. % carbon black in PVB, according to an example of the present disclosure.
Figure 4B:
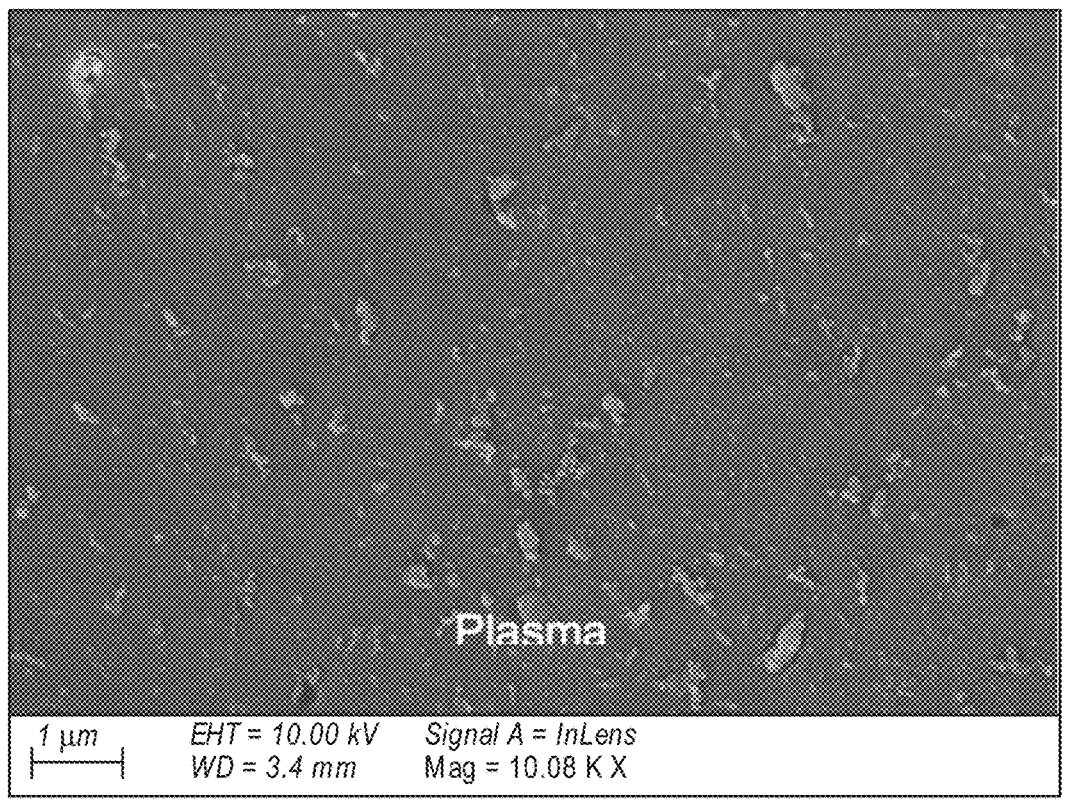
Figure 4C:
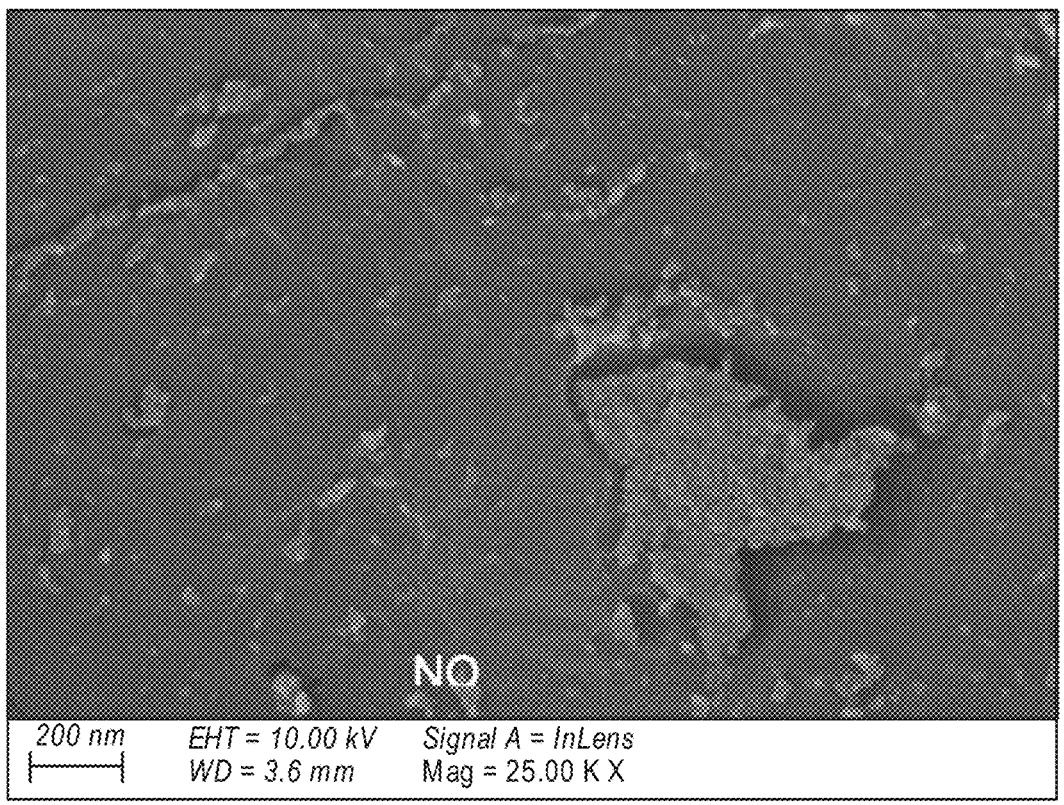
Figure 4D:
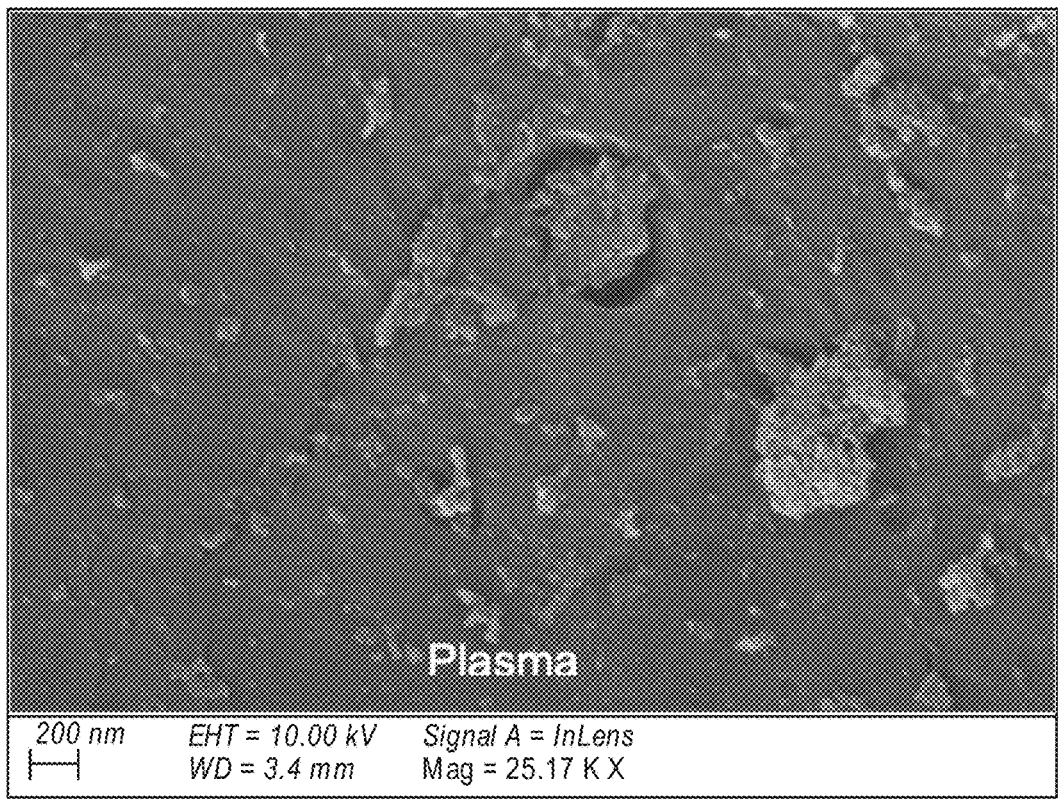
Figure 5A:
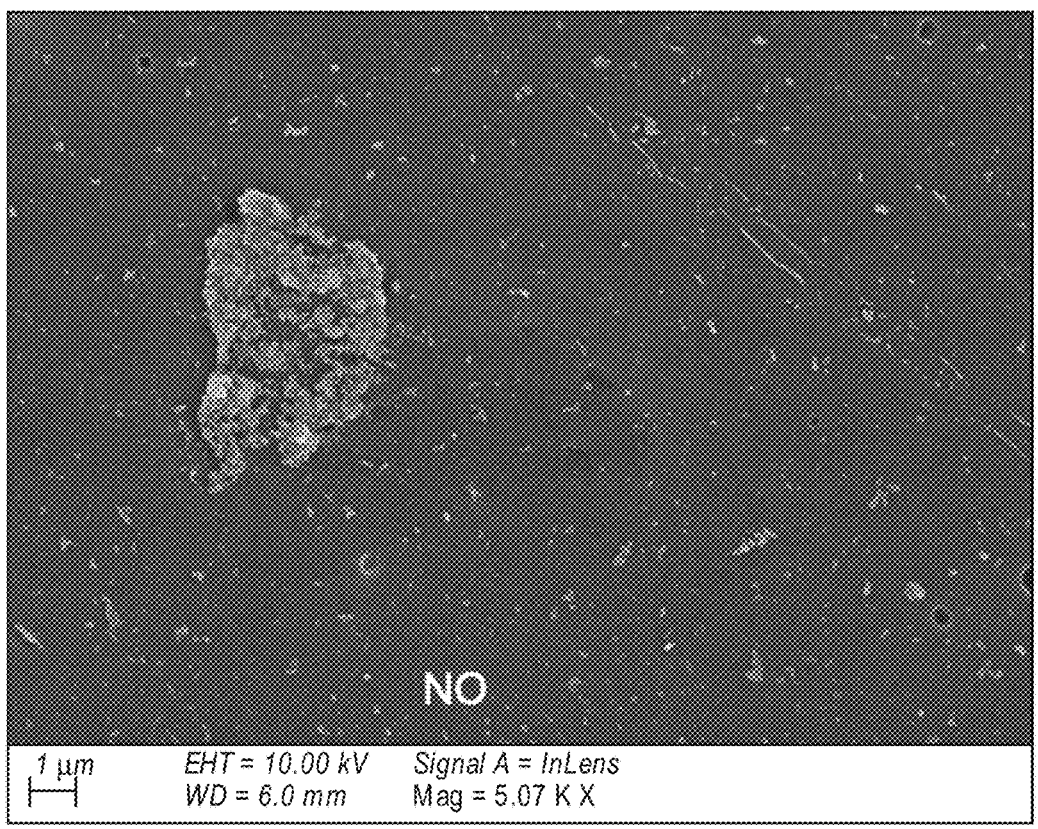
FIGS. 5A, 5B, 5C and 5D show FIB-SEM analysis of carbon black filled PVB pellets having 0.5 wt. % carbon black in PVB, according to an example of the present disclosure.
Figure 5B:
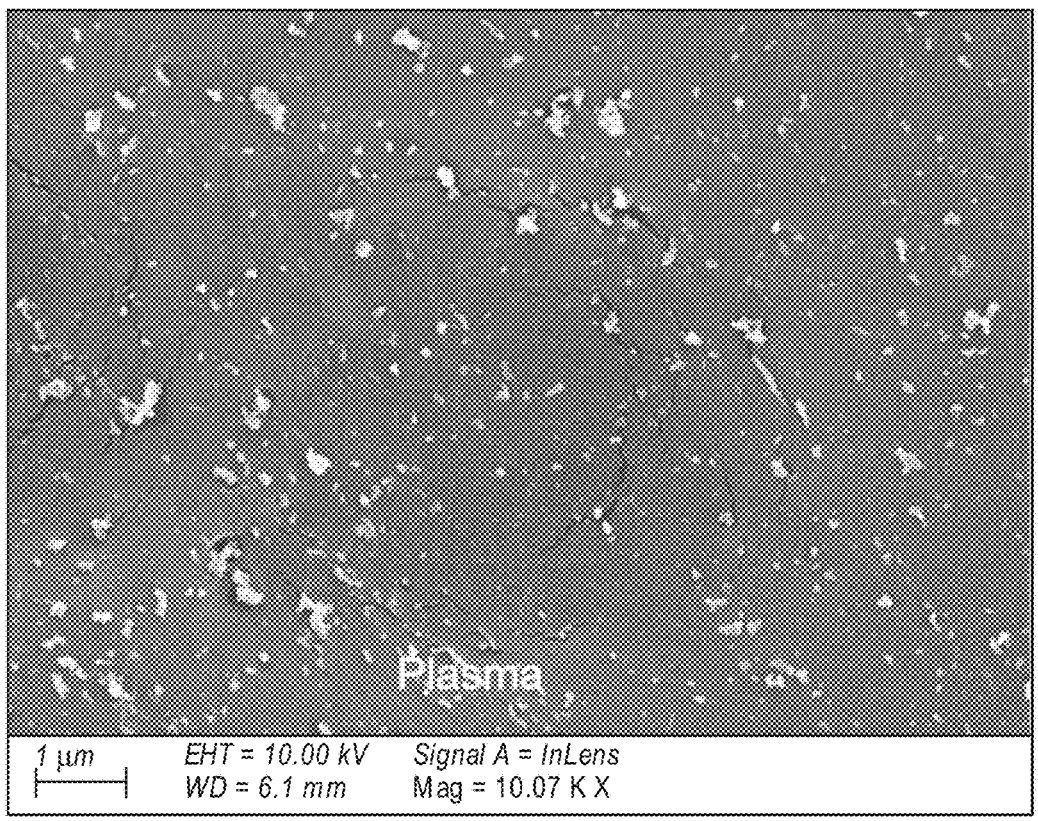
Figure 5C:
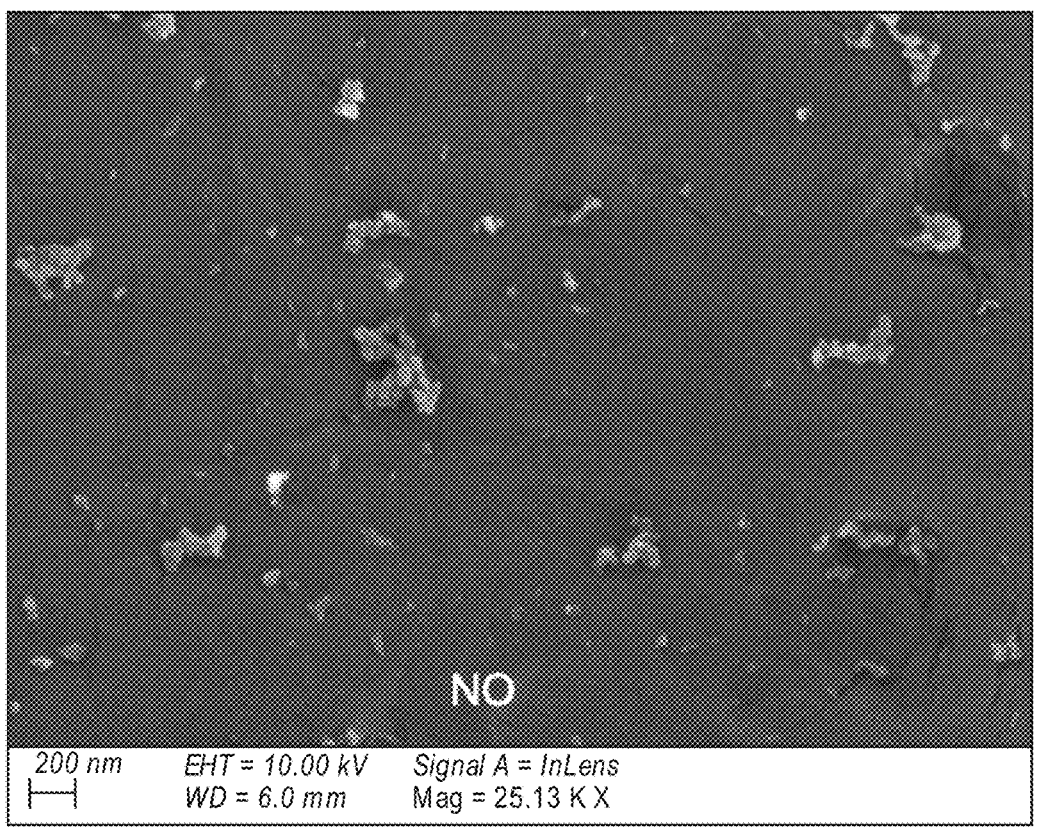
Figure 5D:
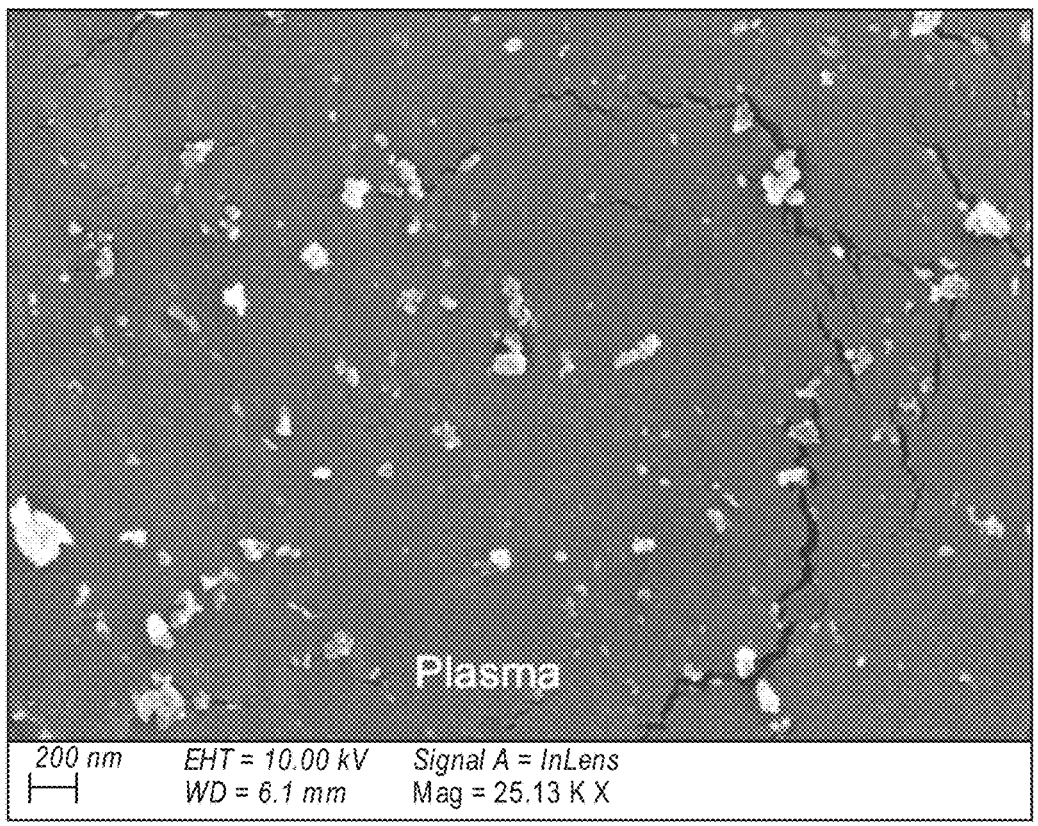
Figure 6A:
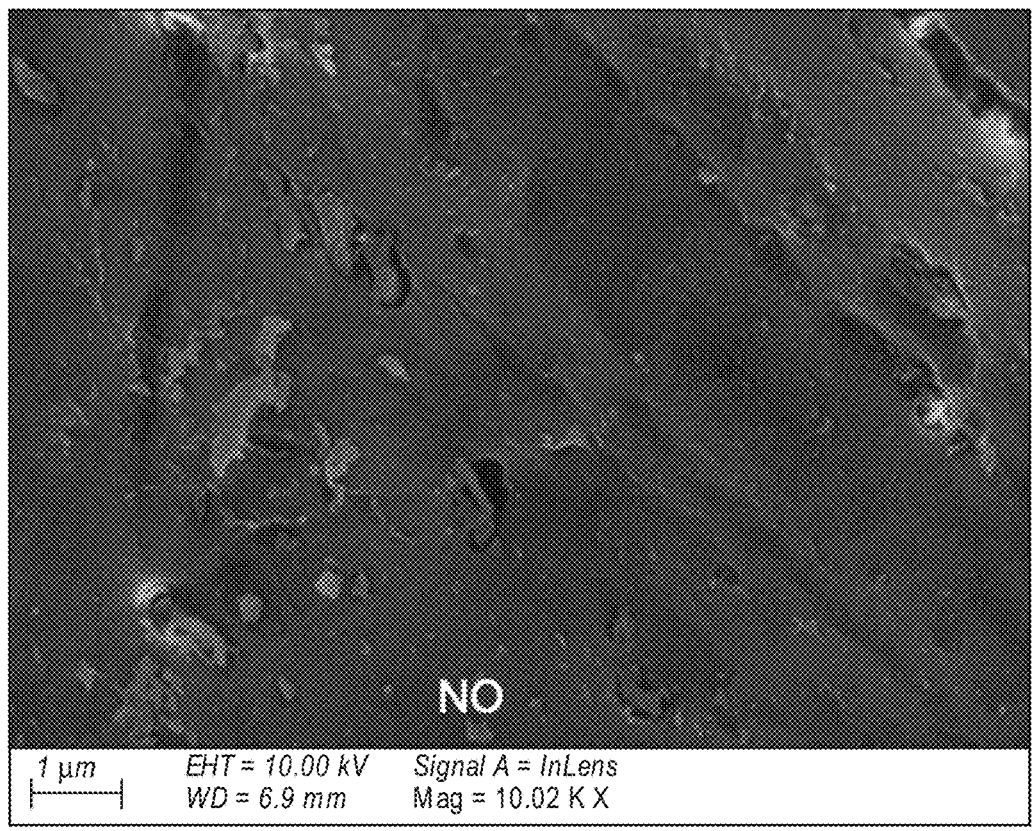
FIGS. 6A, 6B, 6C and 6D show FIB-SEM analysis of carbon black filled PVB pellets having 0.15 wt. % carbon black in PVB, according to an example of the present disclosure.
Figure 6B:
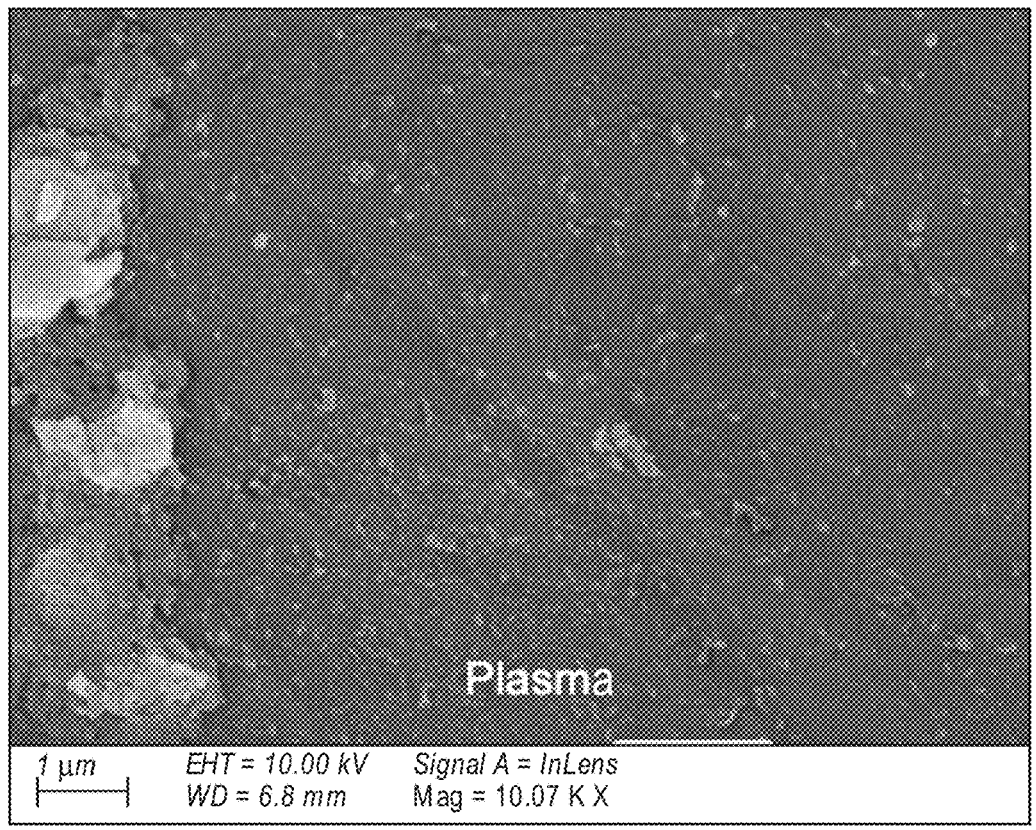
Figure 6C:
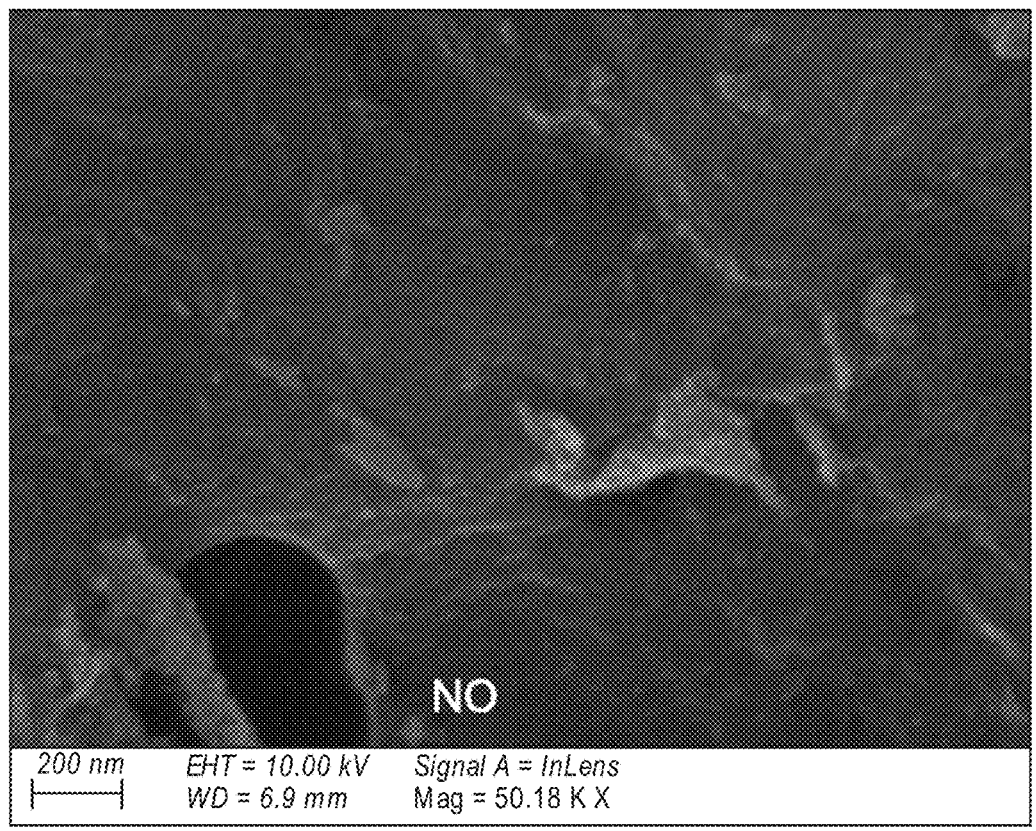
Figure 6D:
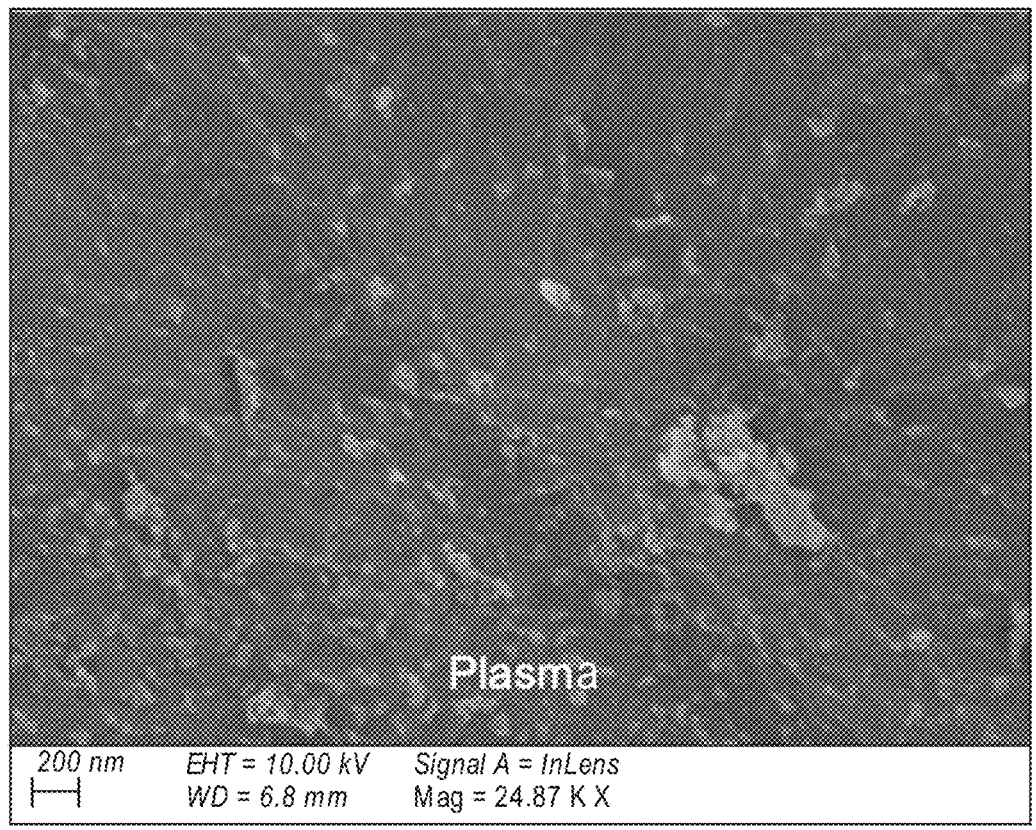

Prior to extrusion, the screws were removed and cleaned. The extruder used was an American Leistritz Extruder Corporation Model ZSE 27. This extruder has a 27 mm co-rotating intermeshing twin screw with 10 zones and a length/diameter ratio of 40. An AccuRate gravimetric feeder used for the polymer powder using a 1 inch open helix with a 1 inch inside diameter polyliner. FIG. 3 shows the extruder screw design used. In this screw design, the KS 3-2-10/30-90° N are 3 of KS1-2-10-M that are each offset 90° from each other. The polymer powder and EC-600 JD carbon black were added at zone 1. A K-Tron KCL-SFS-KT-20 twin screw gravimetric feeder with a 2 blade agitator and concave fine screws were used to feed the EC-600 JD. Water cooling was used on cooling of the extrusion zones.

After passing polymer through three 3 mm diameter holes of the extruder, the resulting polymer strands enter a water bath (~80° F.) and then a ConAir Model 20402HP-14A pelletizer that produced nominally 3 mm long pellets. For each formulation, approximately 2 pounds of pellets were produced. The formulations produced are listed below in Table 1. After extrusion, the pellets were allowed to dry at ambient conditions (23° C., 50% RH) for 2 days and then they were placed in sealed moisture barrier bags.

TABLE 1

Extrusion Samples

| | Sample Code | Extrusion Run Description |
|---|---|---|
| Example 1 | OB45 | 300 RPM = neat B45H PVB ran at 300 rpm extruder screw speed |
| Example 2 | OB45 | 400 RPM = neat B45H PVB ran at 400 rpm extruder screw speed |
| Example 3 | OA1B45 | 1 wt % EC-600 JD in B45 H PVB |
| Example 4 | OA2B45 | 2 wt % EC-600 JD in B45 H PVB |
| Example 5 | OA4B45 | 4 wt % EC-600 JD in B45 H PVB |
| Example 6 | OB60 | 300 RPM = neat B60H PVB ran at 300 rpm extruder screw speed: these pellets had a trace amount of EC-600 JD in them but could be useful to examine to see what results we might get with extremely low carbon black loadings |
| Example 7 | OB60 | 450 RPM = neat B60H PVB ran at 450 rpm extruder screw speed |
| Example 8 | OA1B60 | 1 wt % (really 1.3 wt %) EC-600 JD in B60H PVB |
| Example 9 | OA2B60 | 2 wt % EC-600 JD in B60H PVB |
| Example 10 | OA4B60 | 4 wt % EC-600 JD in B60H PVB |
| Example 11 | OX1B45 | 1 wt % (really 1.25 wt %- lowest we could go) XC72 in B45 H PVB |
| Example 12 | OX2B45 | 2 wt % XC72 in B45 H PVB |
| Example 13 | OX4B45 | 4 wt % XC72 in B45 H PVB |
| Example 14 | OX1B60 | 1 wt % (really 1.6 wt %- lowest we could go) XC72 in B60H PVB |
| Example 15 | OX3B60 | 3 wt % XC72in B60H PVB |
| Example 16 | OX4B60 | 4 wt % XC72 in B60H PVB |
| Example 17 | OX7.5B45 | 7.5 wt % XC72 in B45H PVB |
| Example 18 | OX7.5B60 | 7.5 wt % XC72 in B60H PVB |
| Example 19 | OX1B452E | 1 wt % XC72 in B45H PVB |
| Example 20 | OX1B602E | 1 wt % XC72 in B60H PVB |
| Example 21 | OX0.5B45E2 | 0.5 wt % XC72 in B45H PVB |
| Example 22 | OX0.15B45E2 | 0.15 wt % XC72 in B45H PVB |

The nomenclature for Table 1 sample codes is as follows:
O=Optical Project
A=Akzo Nobel Ketjenblack EC-600 JD carbon black
X=Cabot Vulcan XC72 beaded (pelletized) carbon black
B45=B45H PVB
B60=B60H PVB
2E=used at the end of the formulation name: extruded twice
R=Replicate formulation The pellets made from extrusion samples 3, 4, 11, 12 and 18-22 were analyzed using FIB-SEM. FIG. 4 shows the FIB-SEM analysis of carbon black filled PVB pellets having a 1% carbon black in PVB, as made in Example 11 (OX1B45). The pellets with 1% fill of Example 11 were used for subsequent extrusion runs to produce a lower concentration of carbon black by the addition of more PVB at loadings of 0.5% (Example 21), shown in FIG. 5 and 0.15% (Example 22), shown in FIG. 6. It was clear from the analysis of Examples 21 and 22 that there were still some large aggregates of carbon black even at low concentrations.

In preparation for FIB-SEM analysis, the pellet samples were mounted in a cold set epoxy and allowed to cure overnight. The samples were polished with Struers Abramin polishing unit through 320, 600, 1200, and 4000 grit. A prepolish rotating lap for 30 s with 1 um alumina was performed, as was a Vibromat polish overnight with 0.05 um alumina. The samples were rinsed thoroughly with water, sonicated in RO water for 5 minutes, rinsed thoroughly with water and sonicated again for 5 minutes. Aluminum foil was used to mask ½ of the sample and the sample was plasma treated in oxygen at 300 W and 240 mTorr for 5 minutes. The foil was removed and the samples were then coated with platinum. The coated samples were ground and loaded into a Carl Zeiss CrossBeam Auriga FIB-SEM to examine the surface morphology. Magnifications (using the Polaroid 545 reference) of 5, 10, 25, 50, and occasionally 100 kX were used to image the samples.

Particle Size Analysis in FIB-SEM Images included manually measured sub-micron particle sizes with Image Pro Plus analysis software. Particles greater than 1 urn were not measured. Very small particles were measured at high magnification and listed in the "high mag" column of Table 2. Larger particles were measured at lower magnification and listed in the "low mag" column. Only images of the plasma treated samples were examined to determine particle sizes.

Table 2 gives a somewhat qualitative measurement of the carbon black particle sizes in the samples that were measured from the FIB-SEM images that were collected. Measurements were only made of particles that were not large aggregates (1 micron or less) and were more regular in their particle size. There were two general sizes of submicron particles, those from 80 to 280 nm and those below 30 nm.

Example 23

There are two primary methods to implement this material into cells: hot pressing and solvent softening. Either case employs the molding or extrusion of sheets closely approximating the final installed thickness. A hot pressing technique is employed in this example.

Thin sheets of the extruded material were made by pressing the PVB/Carbon Black pellets in a heated Carver hydraulic press. The pellets were put between sheets of Teflon and slipped into the press heated to 185° C., which was well above the glass transition, to soften the polymer. The Teflon sheets had a texture similar to cloth and produce a somewhat diffused looking surface. A sample film of the 1% loading was put between glass slides and returned to the heated press. The platens were pressed together to allow the glass and polymer to warm to 185° C. before applying some pressure, about 500 lbs. The result was a film that adhered to the glass on both sides. The pressing between slides produced a nearly bubble free laminate (this was a simple process so some bubbles were included near the edges where the initial sheet varied in thickness). The 1% samples of Example 11, even in very thin sheets, were visually opaque. The films produced were made thin enough to allow light transmission with the 0.5% and 0.15% carbon black loadings. The pressed sheet basic thickness was ~0.009" but included one thin section that was closer to 0.003".

Figure 7:
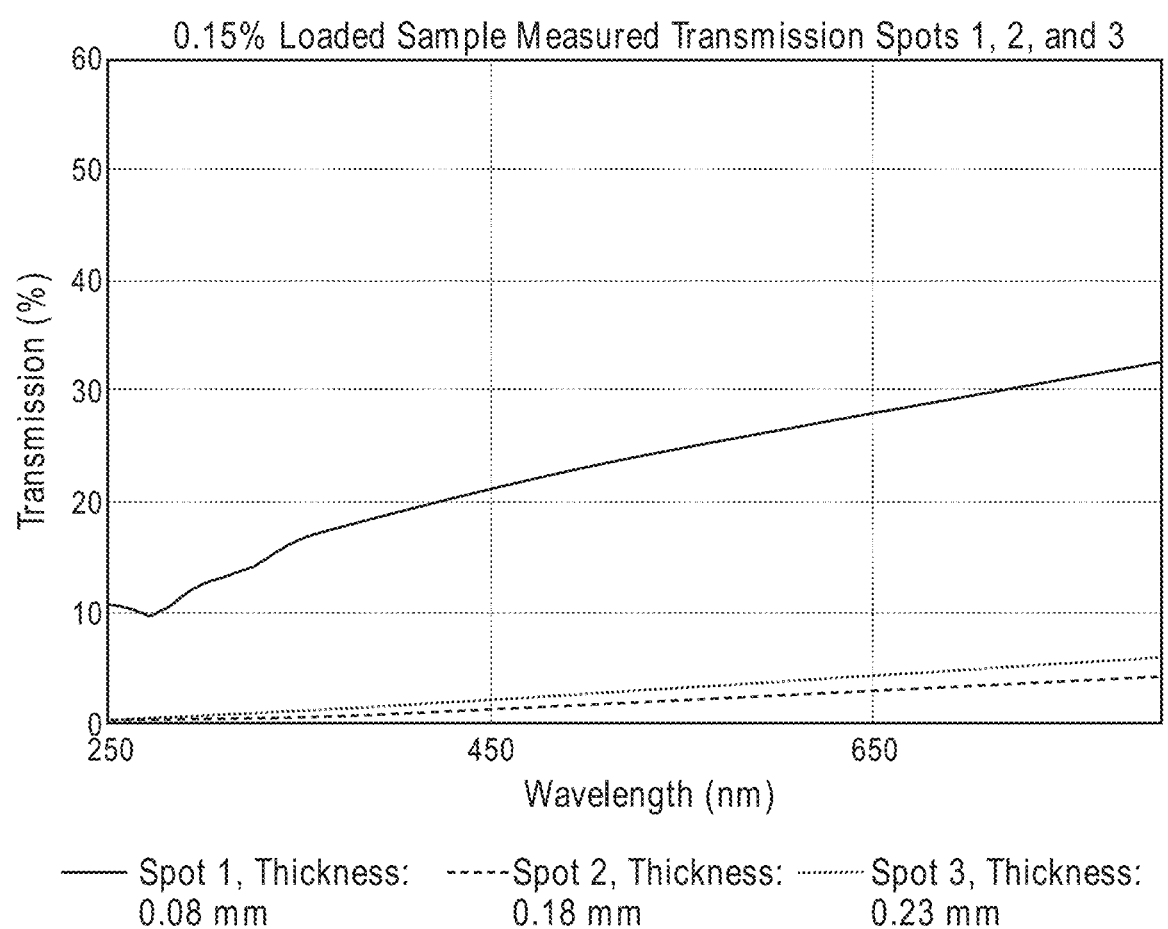
FIG. 7 shows spectral transmission for carbon black filled PVB pellets having 0.15 wt. % carbon black in PVB, according to an example of the present disclosure.
Figure 8:
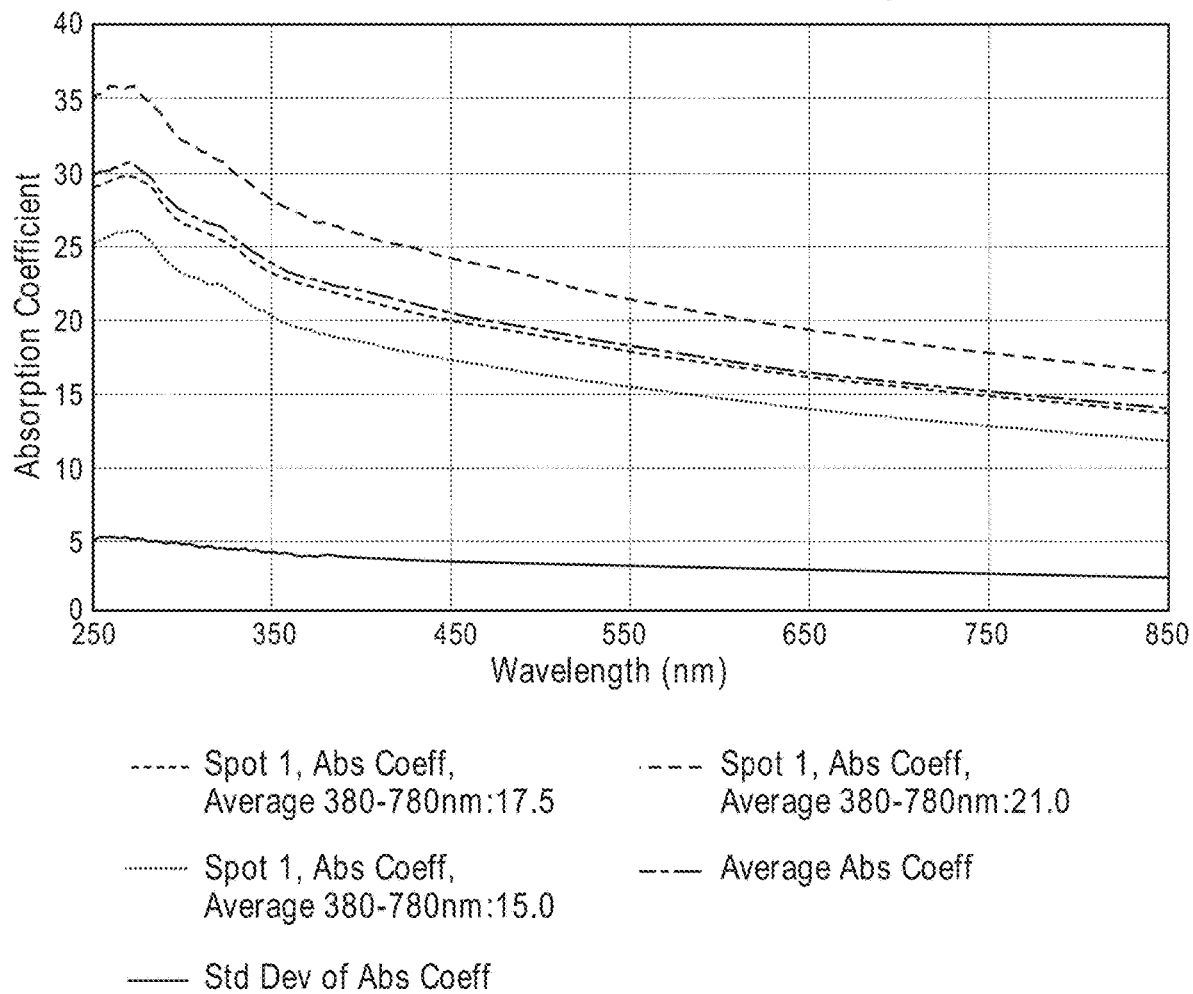
FIG. 8 shows the calculated spectral absorption coefficients for the three spots plus average and standard deviation for carbon black filled PVB pellets having 0.15 wt. % carbon black in PVB, according to an example of the present disclosure.

The 0.15% loaded films are somewhat transparent in these thicknesses. FIG. 7 shows spectral transmission and FIG. 8 illustrates the calculated spectral absorption coefficients for the three spots plus average and standard deviation.

Figure 9:
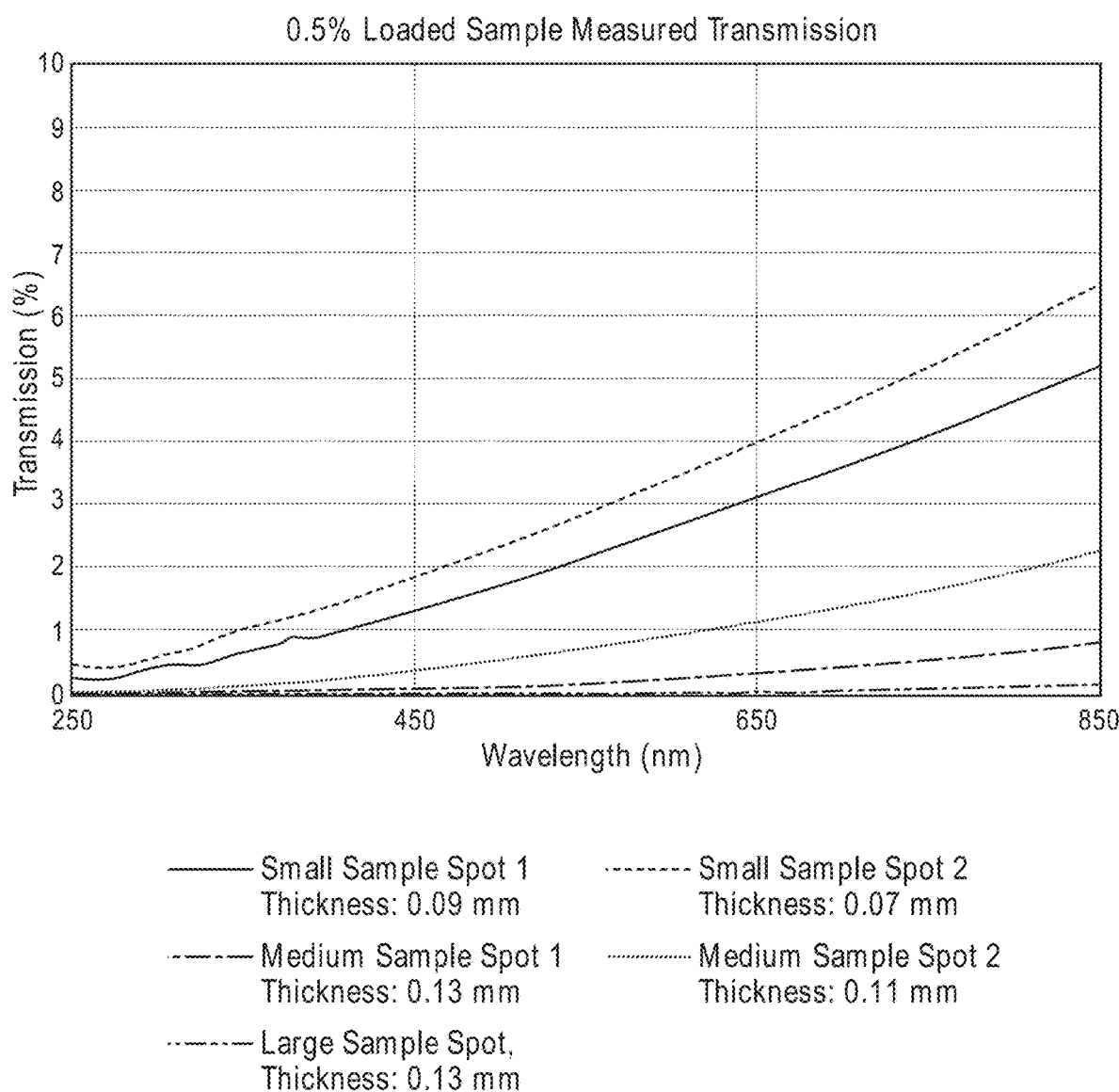
FIG. 9 shows transmission versus wavelength data collected for films of various thickness that were pressed from 0.5% carbon black loaded PVB, according to an example of the present disclosure.
Figure 10:
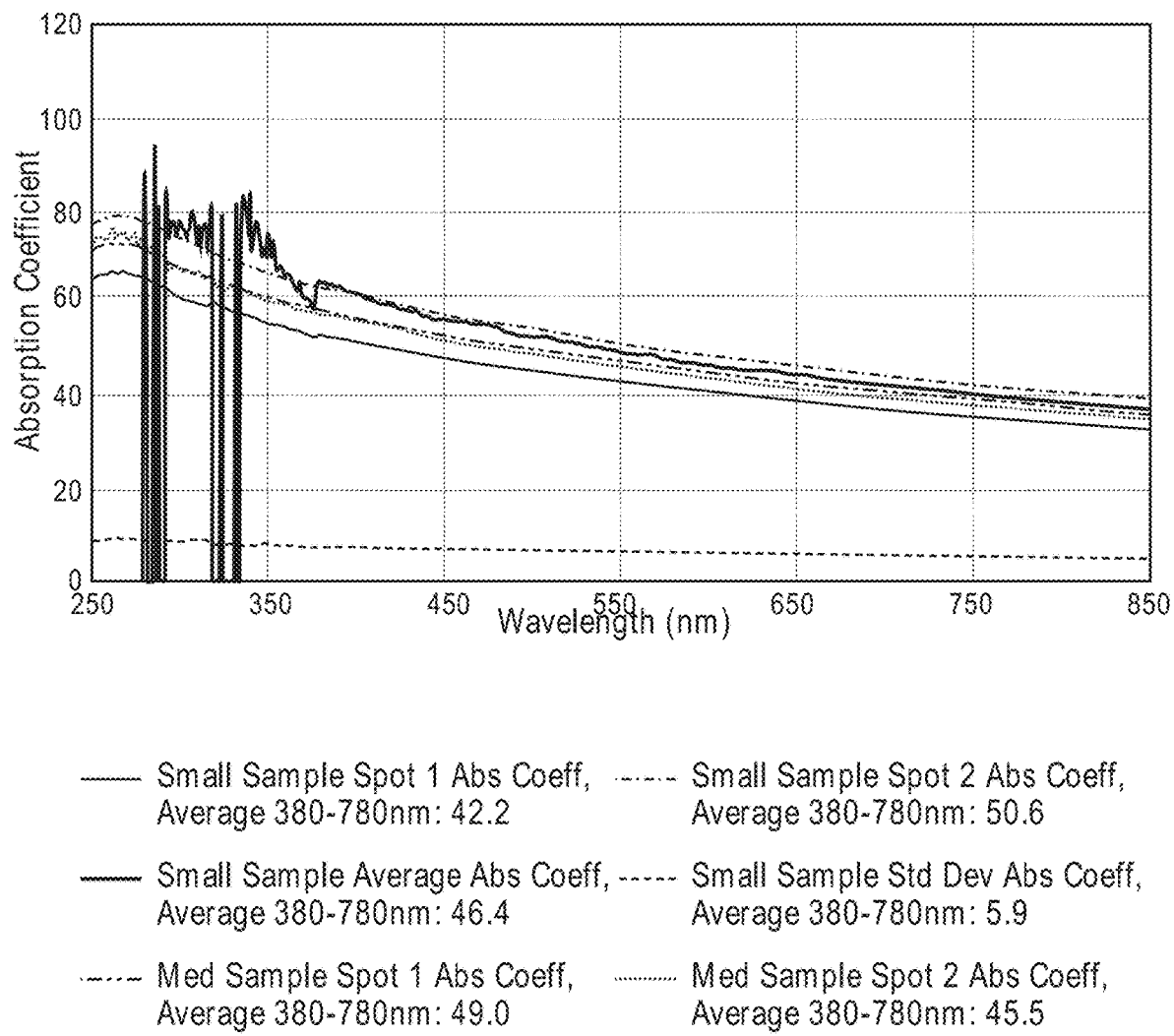
FIG. 10 shows absorption coefficient versus wavelength data calculated from transmission data collected for films of various thickness that were pressed from 0.5% carbon black loaded PVB, according to an example of the present disclosure.

The results of the pressing procedure for 0.5% loaded PVB is shown in FIGS. 9 and 10. Due to the high carbon loading and relative thickness, some of the transmission values, particularly at short wavelengths, were in the noise and did not allow calculation of absorption coefficients. FIG. 10 shows the resultant curve for one of the noisy transmission curves. It can be seen that even the noisy curve could

TABLE 2

Particle Size Analysis of Carbon Black in Extruded PVB Pellets
(Minimum of 20 particle measured per sample image)

| | | High Magnification | | Low Magnification | |
|---|---|---|---|---|---|
| | Pellet | Mean (nm) | Median (nm) | Mean (nm) | Median (nm) |
| Example 11 | OX1B45 | 13 | 13 | 237 | 230 |
| Example 21 | OX0.5B45E2 | 17 | 17 | 265 | 246 |
| Example 22 | OX0.15B45E2 | 15 | 14 | 144 | 122 |
| Example 20 | OX1B602E | 17 | 17 | 161 | 156 |
| Example 8 | OA1B60 | 19 | 18 | 104 | 110 |
| Example 3 | OA2B45 | 21 | 21 | 118 | 112 |
| Example 12 | OX2B45 | 18 | 17 | 80 | 69 |
| Example 18 | OX7.5B60 | | | 266 | 236 |

The master batch of Example 11 (OX1B45R) had larger particle sizes of about 237 nm. Example 21, at 0.5%, had a particle size of about 265 nm, while Example 22 at 0.15%, had a smaller particle size at only about 144 nm. Also looking at Table 2 and comparing the different results between types of carbon black, the Akzo Nobel Ketjenblack EC-600 JD carbon black appears to give a smaller particle size than the Cabot Vulcan XC72 carbon black, but not in all cases, as in the case of Example 12 (OX2B45) with a mean particle size of 80 nm.

be extrapolated into the short wavelengths, following the same trend as the other curves.

Figure 11:
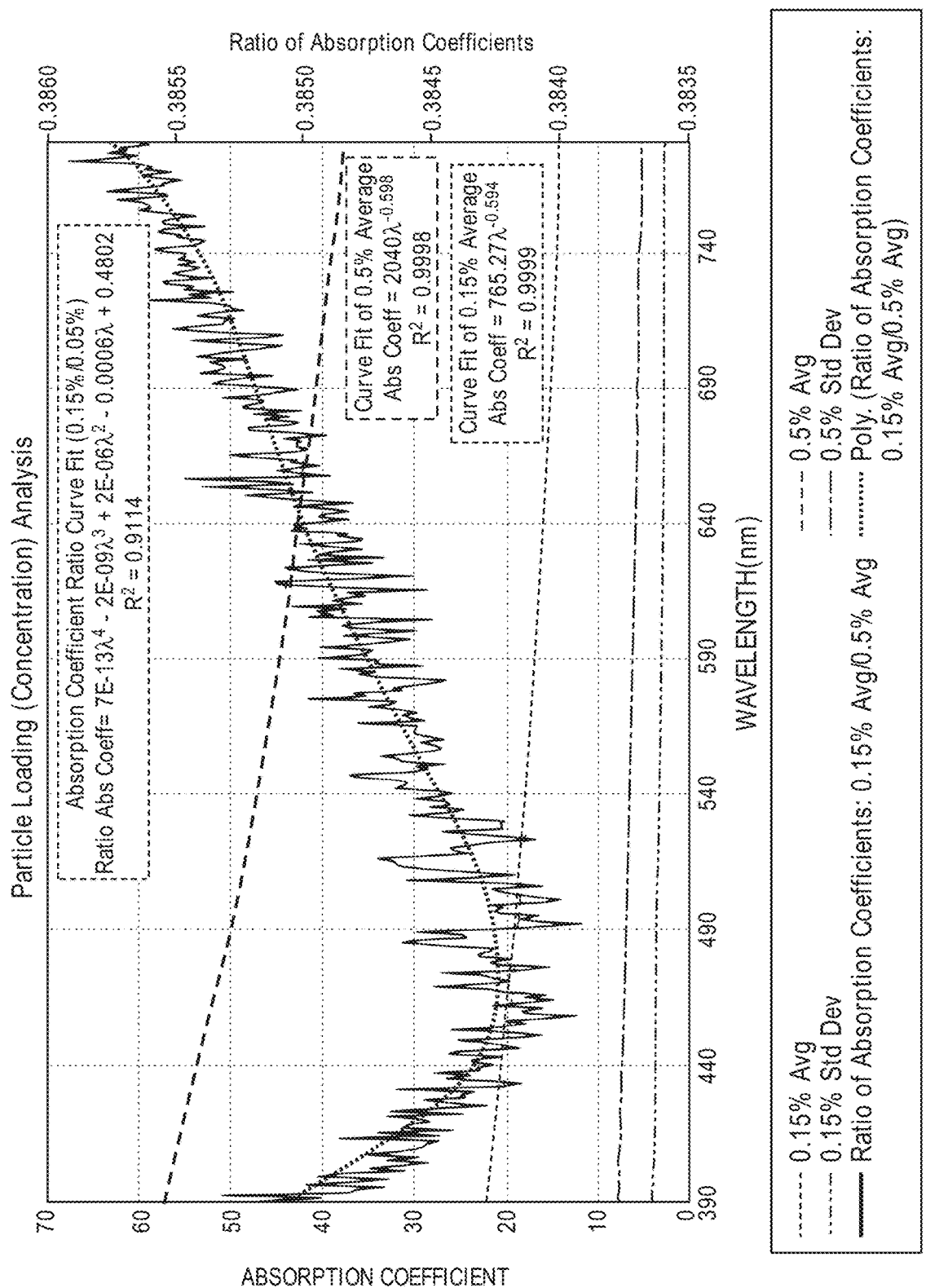
FIG. 11 shows a ratio of 0.15% carbon loading/0.5% carbon loading for absorption coefficient verses wavelength, according to an aspect of the present disclosure.

Some analysis was carried out to determine the effects of particle loading on transmission. At first glance it appeared that absorption coefficient was linearly related to particle loading. The ratio of absorption coefficients (within the current level of accuracy) was very close to the ratio of loading percent by weight and was nearly constant by wavelength, as shown by FIG. 11. Because the ratio of absorption coefficients was nearly constant across the wavelength region, the linear relationship between the particle loading and absorption coefficient was determined using the band average absorption coefficient for both the 0.15% and 0.5% particle loadings.

Figure 12:
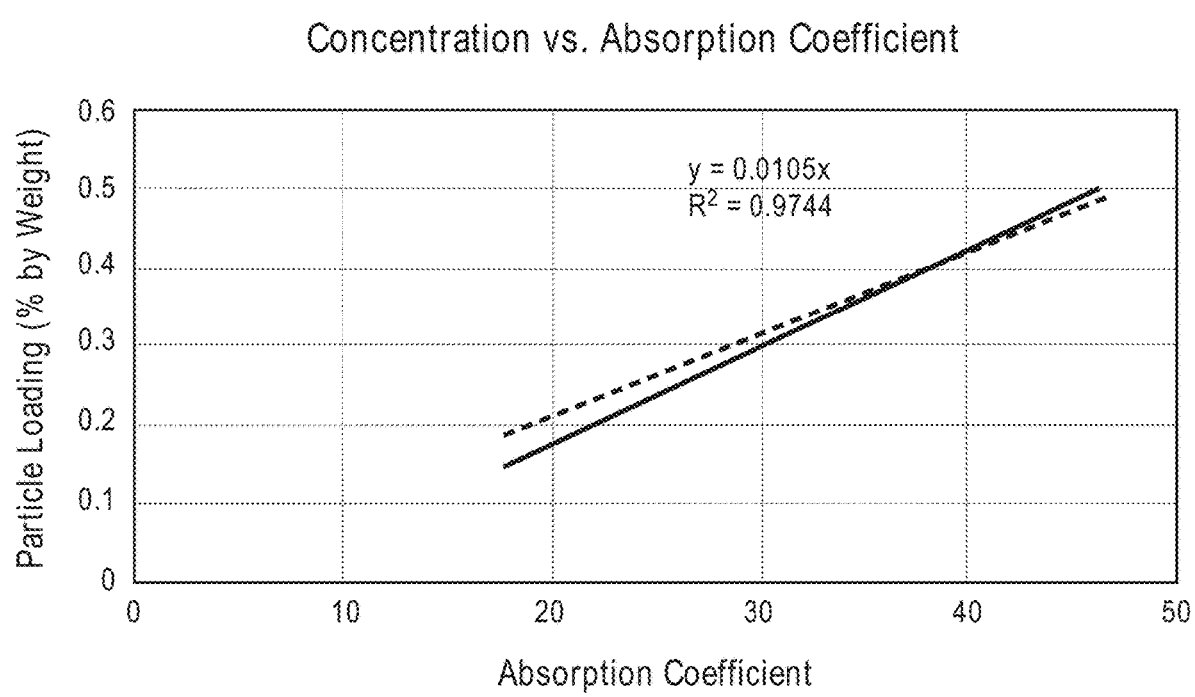
FIG. 12 shows a plot of the particle loading versus Absorption Coefficient data shown in FIG. 11, according to an aspect of the present disclosure.

Plotting the particle loading versus Absorption Coefficient, (FIG. 12), the slope of the linear fit (assuming it is linear) was determined with the absorption coefficient zero at a particle loading of zero. The slope of the line was determined and predicted a particle loading that will give a desired particle loading for the desired thickness from the charted fit. However, the relationship was by default linear since only two concentrations were compared, and Fresnel reflections of the sample were not necessarily taken into account correctly in the initial absorption coefficient calculations. It was noted that the real linear fit of the two data points did not go through the origins, which may be due to the large errors in the initial transmission and thickness measurements as shown by the large standard deviations in the absorption coefficients or the assumption of linearity.

As an example, if the above assumptions are correct, choosing a target thickness of ~0.4 mm for the film and a transmission of ~40% results in an absorption coefficient (alpha) of 2.29. Based on that, a target particle concentration=0.0105*alpha can be calculated, based on the fit in FIG. 12, or approximately 0.025% loading by weight to achieve the about 40% transmission for a 0.4 mm thick film.

Example 24

A filter was made by pressing a 0.15% carbon black PVB film between Optosil™ glass plates. The 0.15% loaded PVB film had a thickness of ~0.10 mm (~0.004"). The resulting filter was sufficiently transparent so that typed text could easily be read through the filter.

Example 25

An OX0.01B45E4 material was made from XC72 in B45H PVB using extrusion techniques of the present disclosure. The batch was extruded four times to reach the concentration of 0.01 wt %. A film was made from the OX0.01B45E4 material using hot pressing procedures similar to those described above for Example 23. The goal was to make a film having carbon black aggregates that are 0.14 to 0.22 µm.

Figure 13:
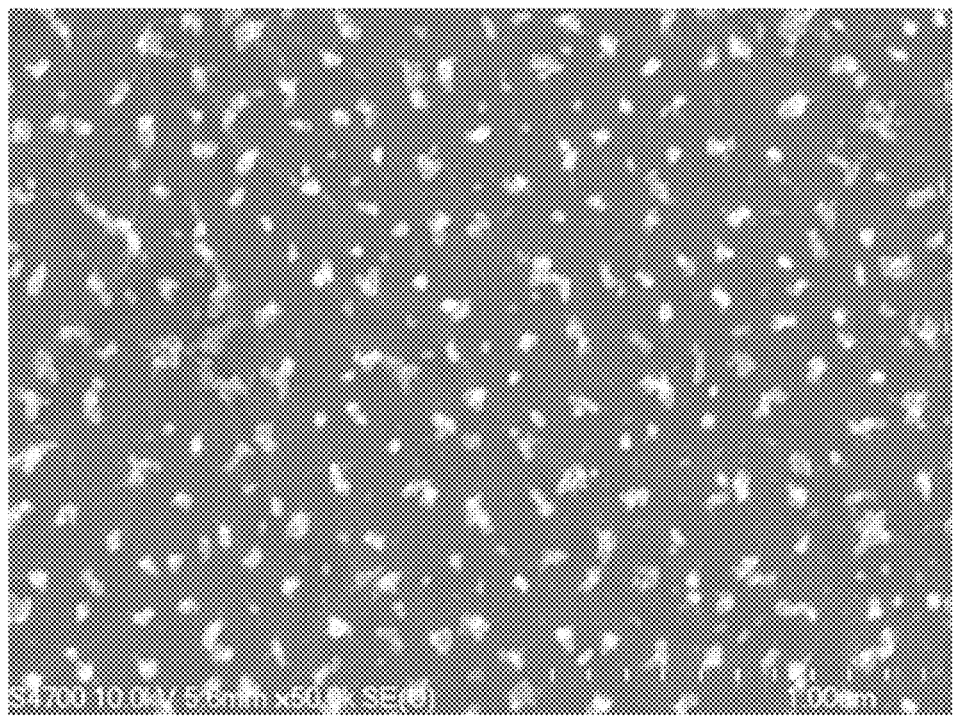
FIG. 13 shows an FESEM photomicrograph collected at 50,000× magnification for a carbon doped PVB film, made according to the methods of the present disclosure.

Photomicrographs were collected at 50,000× magnification, 100,000× magnification and 200,000× magnification at 4 different locations of the film for each level of magnification. All images were acquired with a Hitachi S-4700 field emission scanning electron microscope (FESEM). The operating conditions were 10 kV accelerating voltage with a 5 µA emission current. The working distance was 6 mm using the upper secondary electron detector. Images were collected near the center from two different pieces of flat film and two different through the thickness edges with image lock on. All images appeared to be similar. FIG. 13 shows an example photomicrograph collected at 50,000× magnification for the OX0.01B45E4 film of Example 25.

Figure 14:
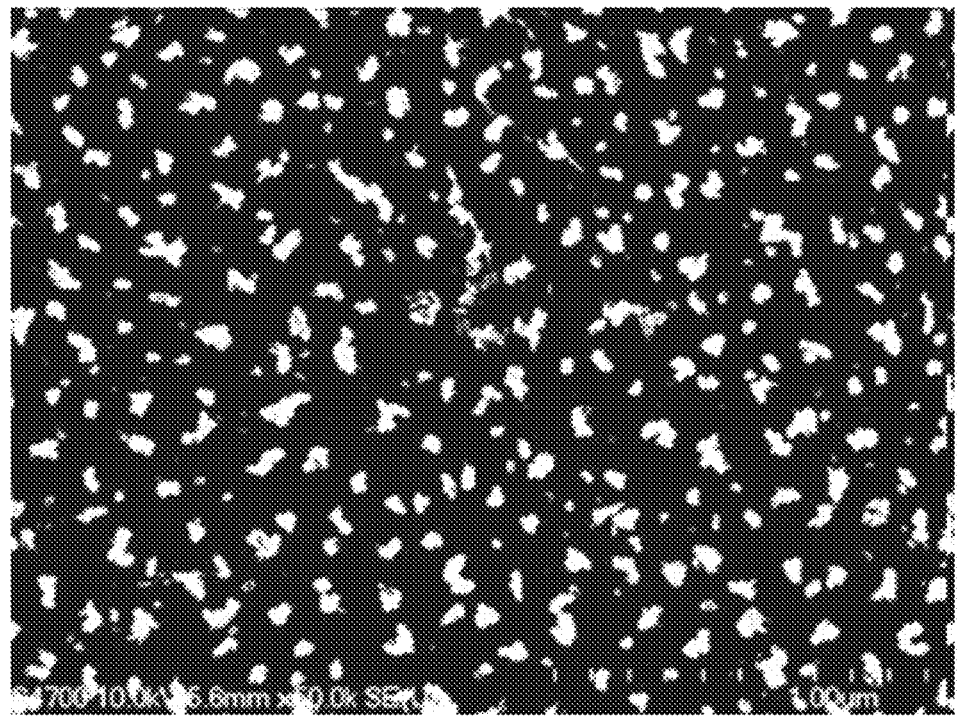
FIG. 14 shows an FESEM photomicrograph image collected at 50,000× magnification using a contrast of ~60% and brightness ~0% for a carbon doped PVB film, according to an example of the present disclosure.
Figure 15:
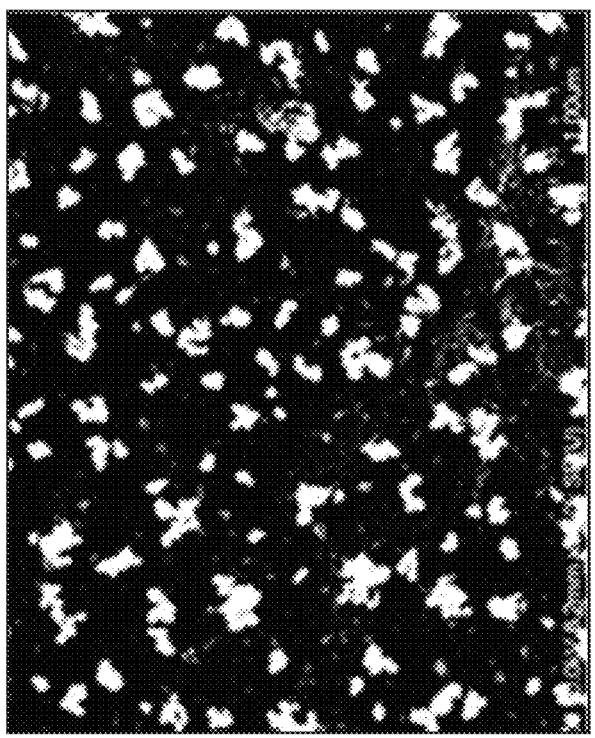
FIG. 15 shows an example inversion of an FESEM image, according to an example of the present disclosure.
Figure 15:
Figure 15:
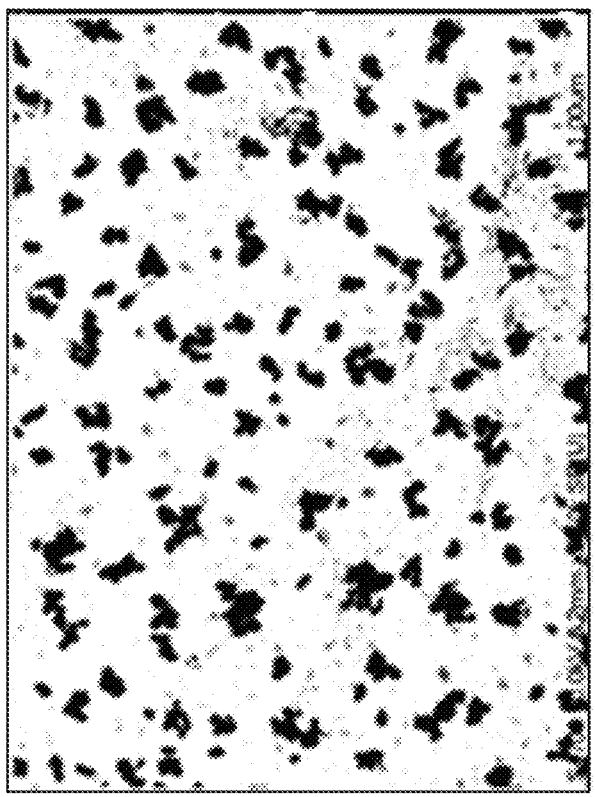
Figure 16:
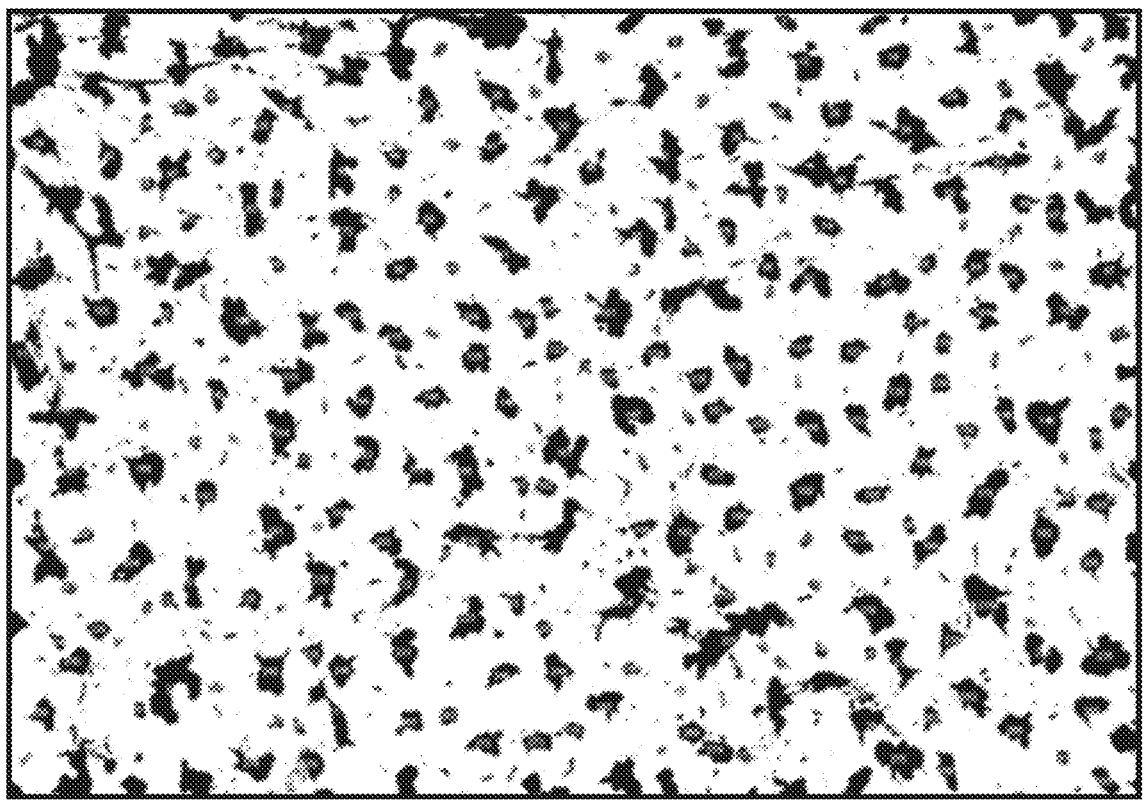
FIG. 16 shows the analysis conducted using the lowest carbon black area of 300 nm$^2$ so it analyzes Feret's diameter >25 nm, according to an example of the present disclosure.

Image analysis images were also collected at 50,000× magnification on the FESEM using a contrast of ~60% and brightness ~0%. FIG. 14 gives an example of such a photomicrograph image used for image analysis at 50,000× magnification. Image analysis was performed on 22 such images obtained by the FESEM at 50,000× magnifications on the OX0.01B45E4 film of Example 25. The images were processed and measured using ImageJ software. The following steps were taken to process the images: 1) Image was converted from RGB (red green blue) to greyscale. 2) Image was inverted to convert the background pixels from black to white and to convert the aggregate pixels from white to black as demonstrated in FIG. 15. 3) The scale bar was measured and scale was set to calibrate the ratio of pixels to a known distance. 4) The scale bar and operating conditions of the FESEM were cropped out of the image. 5) The image was changed into a foreground (carbon black) in red and a background (matrix) in white. 6) Image analysis was conducted on all of the 22 images 4 different times by varying the lowest carbon black particle area measured from 300 nm$^2$ (Feret's diameter of 25 nm) to 1,000 nm$^2$ (Feret's diameter of 50 nm) to 2,800 nm$^2$ (Feret's diameter of 75 nm) and to 4,400 nm$^2$ (Feret's diameter of 100 nm). FIG. 16 shows the analysis conducted using the lowest carbon black area of 300 nm$^2$ so it analyzes Feret's diameter >25 nm. A total of 285 carbon black particles (shown having a number on them in FIG. 16) were measured. As the smallest carbon black area measured increases, the number of particles analyzed decreases. Particles that touch the edges of the image were not counted.

Figure 17:
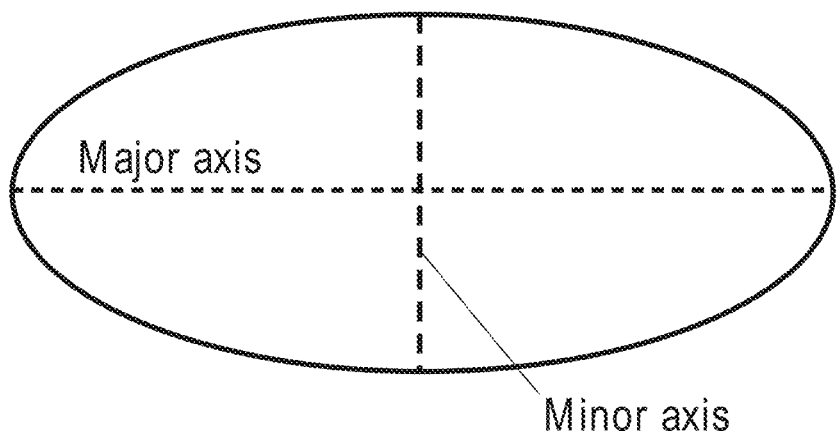
FIG. 17 shows the major and minor axis of an ellipse employed in particle analysis in the examples of the present disclosure.
Figure 18:
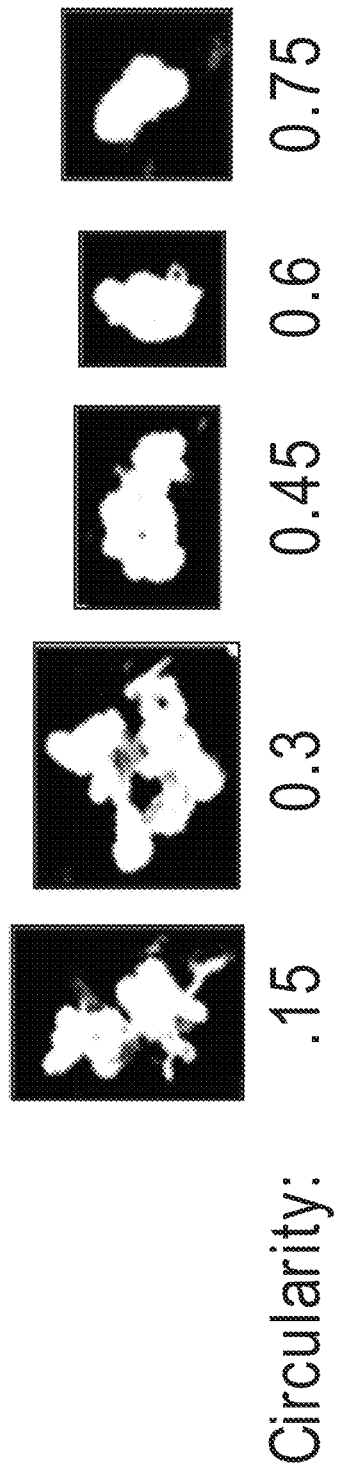
FIG. 18 shows circularity values for some of the actual carbon black images, according to examples of the present disclosure.
Figure 19:
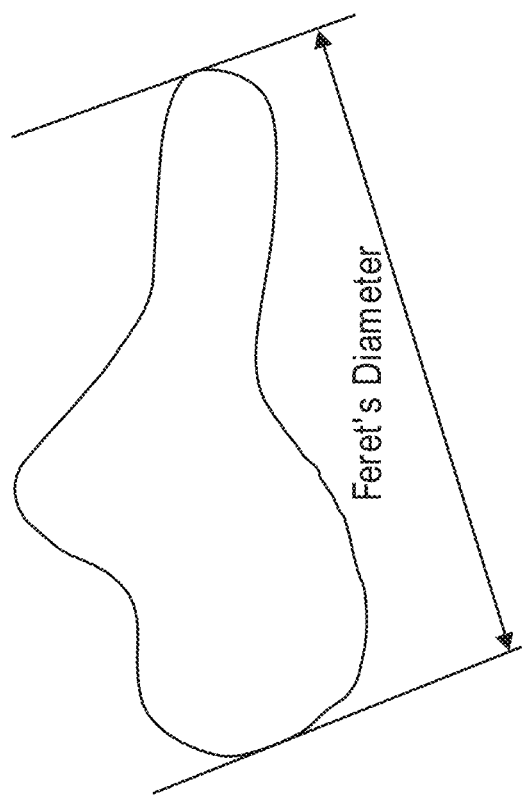
FIG. 19 shows an example of Feret's diameter, as employed in the examples of the present disclosure.

ImageJ image analysis software was used to measure perimeter, length, width, aspect ratio, circularity, and the Feret's diameter of each carbon black particle. The perimeter was the length of the outer boundary of the particle. The length and width of the particles were measured by fitting ellipses to the particles and measuring the major and minor axes, respectively. The major axis was the longest diameter of the fitted ellipse and the minor axis was the shortest diameter of the fitted ellipse, as shown in FIG. 17. The aspect ratio was calculated by dividing the major axis by the minor axis for each particle. Circularity was calculated using Equation 1. A circularity of 1 represents a perfect circle. FIG. 18 shows circularity values for some of the actual carbon black images. The Feret's diameter is the measurement of the furthest distance between any two parallel tangents on the particle, as shown in FIG. 19.

$$f_{circ} = \frac{4\pi A}{P^2} \quad \text{Equation 1}$$

where:

A=Area of particle

P=Perimeter of particle

Table 3 summarizes the image analysis results (mean±standard deviation) for the various threshold areas used. A mean Feret's diameter of 0.158 µm was obtained using a threshold area of 4,400 nm$^2$ and a mean Feret's diameter of 0.133 µm was obtained using a threshold area of 2,800 nm$^2$, which are close to a desired range of 0.14 to 0.22 µm. It was assumed that any particles smaller than 25 nm were likely not carbon black for these calculations.

TABLE 3

Measurements (mean ± standard deviation) of shape descriptors of particles using image analysis on ImageJ software for different thresholds of carbon black particle areas.

| Threshold Area ($nm^2$) | Perimeter (μm) | Length of Major Axis (μm) | Length of Minor Axis (μm) | Circularity | Feret's Diameter (μm) | $\left(\dfrac{AR \text{ major}}{\text{minor}}\right)$ | N |
|---|---|---|---|---|---|---|---|
| 300 | 0.286 ± 0.231 | 0.074 ± 0.042 | 0.042 ± 0.021 | 0.492 ± 0.187 | 0.086 ± 0.053 | 1.819 ± 0.632 | 5,399 |
| 1,000 | 0.363 ± 0.238 | 0.091 ± 0.039 | 0.051 ± 0.018 | 0.448 ± 0.170 | 0.106 ± 0.051 | 1.814 ± 0.569 | 3,759 |
| 2,800 | 0.476 ± 0.257 | 0.112 ± 0.038 | 0.062 ± 0.016 | 0.368 ± 0.141 | 0.133 ± 0.052 | 1.858 ± 0.609 | 2,171 |
| 4,400 | 0.593 ± 0.287 | 0.130 ± 0.041 | 0.070 ± 0.016 | 0.309 ± 0.122 | 0.158 ± 0.056 | 1.912 ± 0.665 | 1,229 |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method of controlling a particle size distribution of a filler in an extrudable composition, the method comprising:
   introducing an extrudable composition comprising a polymer matrix material and a filler into an extruder, the filler having a first average particle size that is larger than a target average particle size; and
   extruding the extrudable composition one or more times using the extruder to reduce the size of the filler from the first average particle size to a reduced average particle size, the reduced average particle size being within 10% of the target average particle size,
   wherein a final concentration of the filler ranges from about 0.001 weight % to less than 1 weight %, relative to the total weight of the extrudable composition.

2. The method of claim 1, wherein the final concentration of the filler ranges from about 0.01 weight % to about 0.15 weight %, relative to the total weight of the extrudable composition.

3. The method of claim 1, wherein the first average particle size ranges from about 20 nm to about 25 millimeters.

4. The method of claim 1, wherein the target average particle size ranges from about 1 nm to about 700 nm.

5. The method of claim 1, wherein a ratio of the first average particle size to the target average particle size ranges from about 1.5 to about 25,000,000.

6. The method of claim 1, further comprising diluting the filler in the extrudable composition to the final concentration.

7. The method of claim 6, wherein the diluting comprises adding a diluent polymer to the extrudable composition and repeating the extruding one or more times, the diluent polymer being the same as the polymer matrix material.

8. The method of claim 7, further comprising repeating the extruding one or more times to further reduce the average particle size of filler.

9. The method of claim 8, further comprising forming the extrudable composition into pellets after each extruding.

10. The method of claim 1, wherein the polymer matrix material comprises at least one polymer chosen from polycarbonates, Polyethylene terephthalate ("PET"), Polyethylene ("PE"), acrylate polymers, vinyl polymers, polyvinylbutyral ("PVB") and a PVB copolymer, the PVB copolymer comprising polyvinylbutyral units and one or more of polyvinyl alcohol units and polyvinyl acetate units.

11. The method of claim 1, wherein the filler is chosen from carbon black, carbon nanotubes, graphene, $TiO_2$ and combinations thereof.

12. The method of claim 1, wherein the final concentration of the filler ranges from 0.01 weight % to 0.3 weight %.

13. A method of controlling a particle size distribution of a filler in an extrudable composition, the method comprising:
   determining a target average particle size for the filler;
   determining a target concentration of the filler;
   introducing a first extrudable composition comprising a polymer matrix material and the filler into an extruder, the filler having a first average particle size that is larger than the target average particle size, the filler being at a concentration ranging from about 0.01 weight % to about 40 weight %, relative to the total weight of the extrudable composition;

extruding the first extrudable composition one or more times to reduce the size of the filler from the first average particle size to a reduced average particle size to thereby form a second extrudable composition, the reduced average particle size being within 10% of the target average particle size; and extruding the second extrudable composition with a diluent polymer to dilute the concentration of the filler to form a third extrudable composition having the target concentration.

14. The method of claim 13, wherein the first average particle size ranges from about 20 nm to about 25 millimeters.

15. The method of claim 13, wherein the target average particle size ranges from about 1 nm to about 700 nm.

16. The method of claim 13, wherein the filler in the first extrudable composition is at a concentration ranging from about 0.1 weight % to about 40 weight %, relative to the total weight of the first extrudable composition.

17. The method of claim 13, wherein the target average particle size ranges from about 10 nm to about 500 nm.

18. The method of claim 13, wherein a ratio of the first average particle size to the target average particle size ranges from about 1.5 to about 25,000,000.

19. The method of claim 13, wherein the target filler concentration ranges from 0.001 weight % to 30 weight %.

20. The method of claim 13, wherein the target filler concentration ranges from 0.001 weight % to 0.3 weight %.

21. The method of claim 13, wherein the diluent polymer is the same as the polymer matrix material.

22. The method of claim 13, where the extruding of the first extrudable composition is carried out 2 to 5 times.

23. The method of claim 13, wherein the polymer matrix material comprises at least one polymer chosen from polycarbonates, Polyethylene terephthalate ("PET"), Polyethylene ("PE"), acrylate polymers, vinyl polymers, polyvinylbutyral ("PVB") and a PVB copolymer, the PVB copolymer comprising polyvinylbutyral units and one or more of polyvinyl alcohol units and polyvinyl acetate units.

24. The method of claim 13, wherein the filler is chosen from carbon black, carbon nanotubes, graphene, $TiO_2$ and combinations thereof.

* * * * *